United States Patent [19]
Watanabe et al.

[11] Patent Number: 5,203,600
[45] Date of Patent: Apr. 20, 1993

[54] APPARATUS FOR PROTECTING A REAR PASSENGER FOR AN AUTOMOTIVE VEHICLE

[75] Inventors: Yasukazu Watanabe; Hidemi Aoki; Masatoshi Takayama; Tadashi Ioka; Katsumi Sakane; Noritaka Sakiyama; Yasunari Hirotani; Naomi Mitani; Kazuhiro Ushijima, all of Hiroshima, Japan

[73] Assignee: Mazda Motor Corporation, Hiroshima, Japan

[21] Appl. No.: 723,904

[22] Filed: Jul. 1, 1991

[30] Foreign Application Priority Data

Jun. 29, 1990 [JP] Japan ................. 2-173262
Jun. 29, 1990 [JP] Japan ................. 2-173824
Sep. 27, 1990 [JP] Japan ................. 2-258703
Sep. 27, 1990 [JP] Japan ................. 2-258704

[51] Int. Cl.$^5$ ........................................ B60N 2/22
[52] U.S. Cl. .................. 296/68.1; 297/361; 180/282
[58] Field of Search .......... 297/330, 361; 180/271, 180/282; 296/68.1, 65.1

[56] References Cited

U.S. PATENT DOCUMENTS

| 2,140,423 | 12/1988 | Frees | 296/65.1 |
| 4,729,538 | 3/1988 | Bergacket et al. | 296/65.1 |
| 4,907,153 | 3/1990 | Brodsky | 296/65.1 |

FOREIGN PATENT DOCUMENTS

| 1405239 | 3/1969 | Fed. Rep. of Germany | 296/65.1 |
| 2836004 | 3/1980 | Fed. Rep. of Germany | 297/330 |
| 175438 | 10/1982 | Japan | 296/65.1 |

Primary Examiner—Karin L. Tyson
Attorney, Agent, or Firm—Fish & Richardson

[57] ABSTRACT

An automotive vehicle has a rear header disposed at a rear end of the roof and above a rear seat. For example, in the event where the automotive vehicle is about to roll, the seat back of the rear seat is leaned forwards and the upper end portion of the seat back is leaned forwards, thereby forcibly repositioning the head of the rear passenger seated on the rear seat to the position remoter from the back window panel.

12 Claims, 23 Drawing Sheets

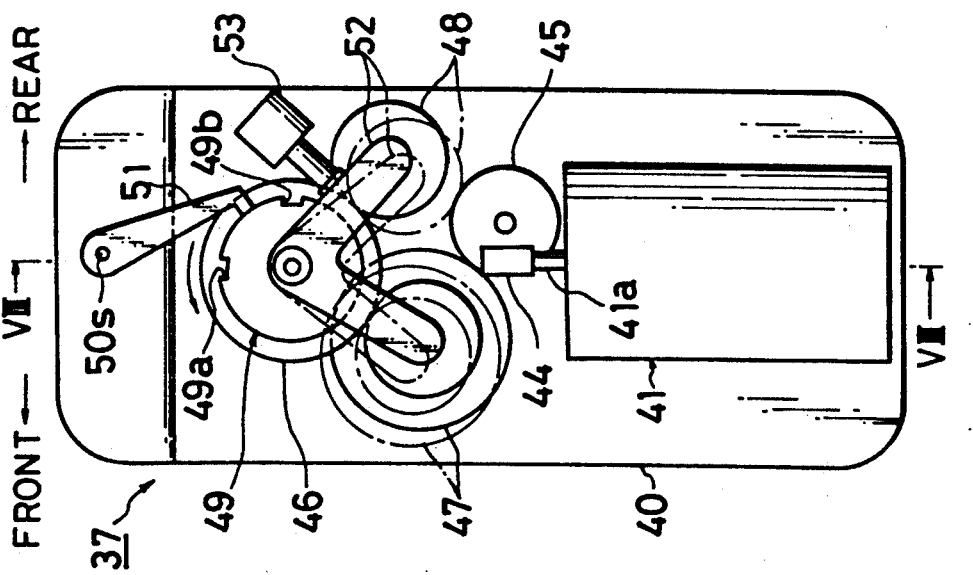

APPARATUS FOR PROTECTING A REAR PASSENGER FOR AN AUTOMOTIVE VEHICLE

BACKGROUND OF THE INVENTION

1. Field of the Invention

The present invention relates to an apparatus for protecting a rear passenger seated on a rear seat for an automotive vehicle.

2. Description of Related Art

Recent years, in order to meet diversified demands of consumers and provide passengers with wider rear view and more open feeling, automotive vehicles have been provided which have an overall outlook designed in a smoothly curved shape and which is provided with a back window panel having a panel area wider than conventional ones.

As disclosed in Japanese Utility Model Laid-open Publication (kokai) No. 194,037/1988, there is the recently increasing tendency that a rear header is disposed above a rear seat from the point of view of designing or enlarging a space within a vehicle compartment. In other words, for such automotive vehicles, the rear header is disposed above the head of the rear passenger seated on the rear seat, as a reinforcing member located at a rear end of the roof, and the back window panel is disposed to be directed in an obliquely downward direction from the rear header. Hence, the position of the rear header relative to the rear seat is moved to the forward position of the vehicle body as compared with conventional ones.

When the position of the rear header relative to the rear seat is moved in the forward direction as compared with conventional ones, a glass panel area of the back window glass can be made so wider than the conventional ones that an enlarged rear view can be given, thereby providing the passenger with open feeling. It is to be noted, however, that, for example, when the rear passenger seated on the rear seat is caused to be lifted upwards by full rebounding the vehicle body particularly in the event that the automotive vehicle is about to roll, or for other reasons, the head of the rear passenger may come close to the back window panel or a view outside the automotive vehicle may catch an eye of the rear passenger in such a state that the passenger is lifted upwards, so that this provides the rear passenger with psychologically great anxiety.

However, conventional automotive vehicles cannot wipe out such psychological anxiety on the part of the rear passenger due to, among others, a lack of the freedom of arranging for the rear portion of the vehicle body, particularly for the position of the rear header in the longitudinal direction of the vehicle body, i.e. the size of the back window panel.

SUMMARY OF THE INVENTION

The present invention is to provide an apparatus for protecting a rear passenger seated on a rear seat so adapted as to provide the rear passenger with psychological freedom from anxiety when the rear passenger is caused to be lifted upwards in such a state that the rear passenger is seated on the rear seat.

In order to achieve the aforesaid object, one aspect of the present invention consists of an apparatus for protecting a rear passenger seated on a rear seat for an automotive vehicle having a rear header so disposed at a rear end portion of a roof and above a rear seat in a transverse direction of a vehicle body as to support an upper end of a back window panel disposed at a rear portion of a vehicle compartment, characterized by:

a first moving mechanism disposed at the rear seat to move at least an upper end portion of the seat back forwards;

first driving means so associated with the first moving mechanism as to move at least the upper end portion of the seat back forwards;

detecting means for detecting the possibility of moving the rear passenger seated on the rear seat upwards from the rear seat in such a state that the rear passenger is seated thereon; and first control means for controlling operation of the first driving means so as to move at least the upper end portion of the seat back forwards when it is determined on the basis of a signal from the detecting means that there is the possibility of moving the rear passenger upwards from the rear seat in a state in which the rear passenger is seated thereon.

This first aspect of the present invention can forcibly move at least the head of the rear passenger forwards by displacing at least the upper end portion of the seat back forwards when the automotive vehicle is about to roll. In other words, the rear passenger is caused to be forcibly moved to the position remote from the back window panel so that the physical anxiety of the rear passenger can be wiped out.

In another aspect, the present invention consists of an apparatus for protecting a rear passenger seated on a rear seat for an automotive vehicle having a rear header so disposed at a rear end portion of a roof and above a rear seat in a transverse direction of a vehicle body as to support an upper end of a back window panel disposed at a rear portion of a vehicle compartment, characterized by:

a second moving mechanism so disposed as to move at least an upper end portion of the seat back of the rear seat upwards;

second driving means so associated with the second moving mechanism as to move at least the upper end portion of the seat back of the rear seat upwards;

detecting means for detecting the possibility of moving the rear passenger seated on the rear seat upwards from the rear seat in such a state that the rear passenger is seated thereon; and second control means for controlling operation of the second driving means so as to move at least the upper end portion of the seat back upwards when it is determined in response to a signal from the detecting means that there is the possibility of moving the rear passenger upwards from the rear seat in a state in which the rear passenger is seated thereon.

This second aspect of the present invention is so adapted as to remove psychological anxiety from the rear passenger seated on the rear seat, for example, in the event that the automotive vehicle is about to roll, by displacing at least the upper end portion of the seat back of the rear seat upwards and thereby shortening a distance between the upper end of the seat back and the rear header. In other words, at least the upper end portion of the seat back is allowed to move upwards in such a manner that it is associated with a lifting movement of the rear passenger seated on the rear seat, so that the upper end portion of the seat back can prevent the head of the rear passenger from approaching to the back window panel.

In a further aspect, the present invention consists of an apparatus for protecting a rear passenger seated on a rear seat for an automotive vehicle having a rear header so disposed at a rear end portion of a roof and above a rear seat in a transverse direction of a vehicle body as to support an upper end of a back window panel disposed at a rear portion of a vehicle compartment, characterized by:

a passenger-protecting member for protecting a passenger so arranged as to be movable between a first position and a second position, a first position being located along a front face of the back window panel, in which the passenger is protected when the passenger is moved upwards while the passenger is seated on the rear seat, and a second position being accommodated within a vehicle-body structuring member and located remote from the front face of the back window panel, in which the passenger-protecting member is accommodated;

third driving means interposed between the first position and the second position so as to move the passenger-protecting member;

detecting means for detecting the possibility of moving the rear passenger seated on the rear seat upwards from the rear seat in such a state that the rear passenger is seated thereon; and third control means for controlling operation of the third driving means so as to move the passenger-protecting member located in the second position to the first position when it is determined in response to a signal from the detecting means that there is the possibility of moving the rear passenger upwards from the rear seat in a state in which the rear passenger is seated thereon.

This third aspect of the present invention can allow the passenger-protecting member to appear on the inner side of the back window panel and as a consequence to prevent the head of the rear passenger seated on the rear seat from approaching to the back window panel, for example, in the event that the automotive vehicle is about to roll.

BRIEF DESCRIPTION OF THE DRAWINGS

FIGS. 1 to 3 are directed to the first embodiment of the present invention, in which FIG. 1 is a schematic diagram showing an overall construction of the apparatus according to the embodiment of the present invention; FIG. 2 is a perspective view showing the structure of a frame of the rear seat; and FIG. 3 is a sectional view taken along line III—III of FIG. 2.

FIGS. 4 to 10 are directed to the second embodiment of the present invention, in which FIG. 4 is a schematic diagram showing the automotive vehicle when looked from the side; FIG. 5 is a longitudinally sectional view of a rear header portion of the automotive vehicle; FIG. 6 is a perspective view of the rear seat; FIG. 7 is a front view of a driving apparatus for driving the seat back of the rear seat; FIG. 8 is a sectional view taken along line VIII—VIII of FIG. 7; FIG. 9 is a block diagram describing a control system of the driving apparatus for driving the seat back of the rear seat; and FIG. 10 is a flow chart for describing the operation of the driving apparatus for driving the seat back of the rear seat.

FIGS. 11 and 12 are directed to the third embodiment of the present invention, in which FIG. 11 is a schematic diagram showing an outline of the rear seat portion of the vehicle body when looked at its side; and FIG. 12 is a schematic diagram describing the action of the sensors disposed in the control system.

FIGS. 13 to 15 are directed to the fourth embodiment of the present invention, in which FIG. 13 is a perspective view showing the rear seat when looked at its side; FIG. 14 is a sectional view taken along line X4—X4; and FIG. 15 is a sectional view taken along line X5—X5.

FIGS. 17 to 19 are directed to the sixth embodiment of the present invention, in which FIG. 17 is a partially perspective view showing the rear seat when looked from the obliquely forward position; FIG. 18 is a perspective view showing the rear seat when looked at its side; and FIG. 19 is a rear view showing the rear seat when looked from its rearward position.

FIGS. 21 and 22 are directed to the eighth embodiment of the present invention, in which FIG. 21 is a perspective view showing the rear seat when looked at its side; and FIG. 22 is a schematic diagram showing an overall construction of a mechanism raising the rear seat.

FIGS. 23 and 24 are directed to the ninth embodiment of the present invention, in which FIG. 23 is a perspective view showing the rear seat when looked at its side; and FIG. 24 is a schematic diagram showing a construction of a mechanism raising the rear seat.

FIGS. 25 to 30 are directed to the tenth embodiment of the present invention, in which FIG. 25 is a sectional view showing an outline of the rear portion of the vehicle body; FIG. 26 is a view showing the vehicle body when looked at its rear; FIG. 27 is a front view showing a bar disposed at an upper end of a net; FIG. 28 is a sectional view taken along line XX8—XX8 of FIG. 25; FIG. 29 is a sectional view taken along line XX9—XX9 of FIG. 25; and FIG. 30 is a sectional view showing the site as indicated by arrow XXX in FIG. 25.

FIGS. 31 and 32 are directed to the eleventh embodiment of the present invention, in which FIG. 31 is a schematic view when looked at its rear; and FIG. 32 is a sectional view taken along line XXX2—XXX2 of FIG. 31.

FIGS. 33 to 35 are directed to the twelfth embodiment of the present invention, in which FIG. 33 is a schematic diagram when looked at its oblique rear; FIG. 34 is a sectional view taken along line XXX4—XXX4 of FIG. 33; and FIG. 35 is a perspective view showing a board.

FIGS. 36 and 38 are directed to the thirteenth embodiment of the present invention, in which FIG. 36 is a sectional view showing the rear portion of the vehicle body; FIG. 38 is a sectional view taken along line XXX8—XXX8 of FIG. 37.

DESCRIPTION OF THE PREFERRED EMBODIMENTS

The present invention will be described more in detail by way of examples with reference to the accompanying drawings.

Figure 1:
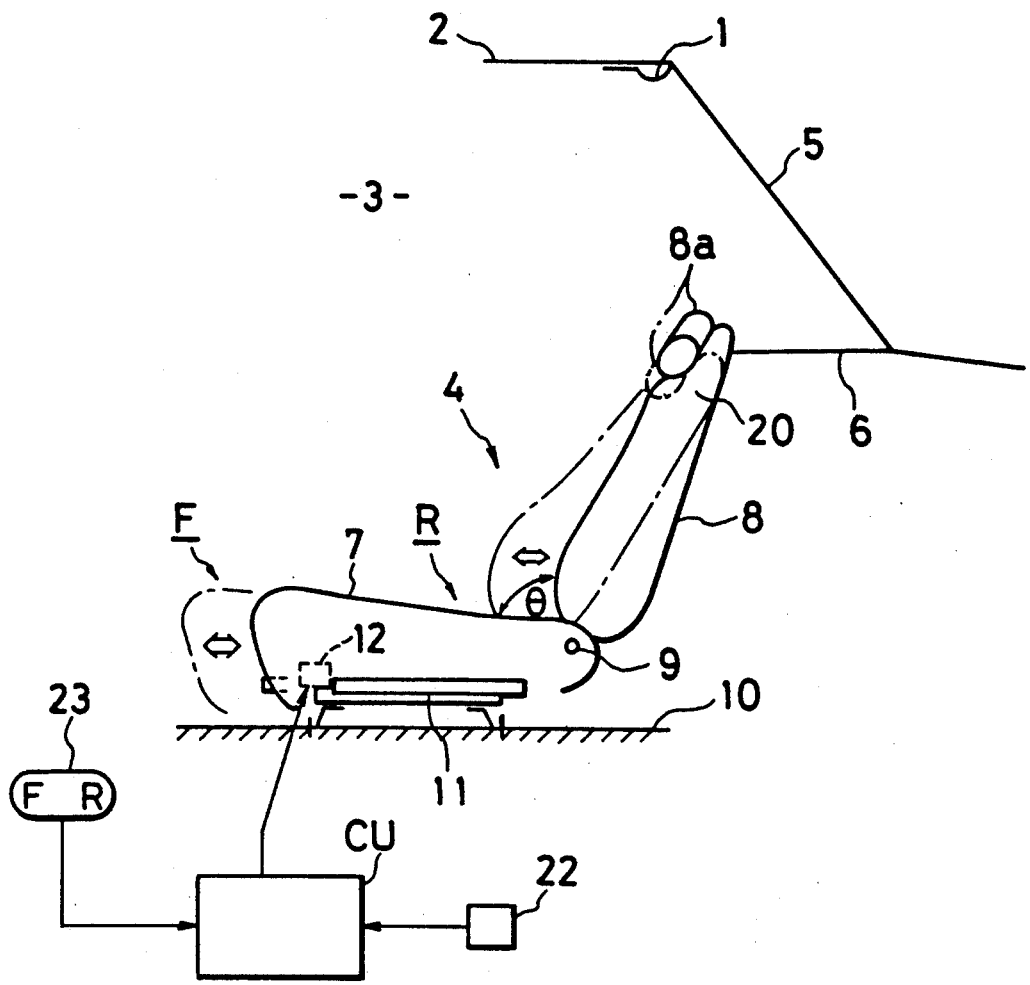
Figure 3:
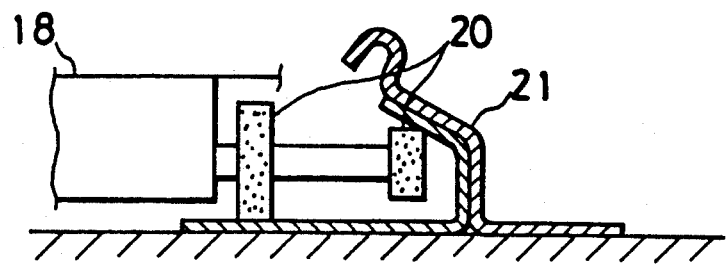
Figure 2:
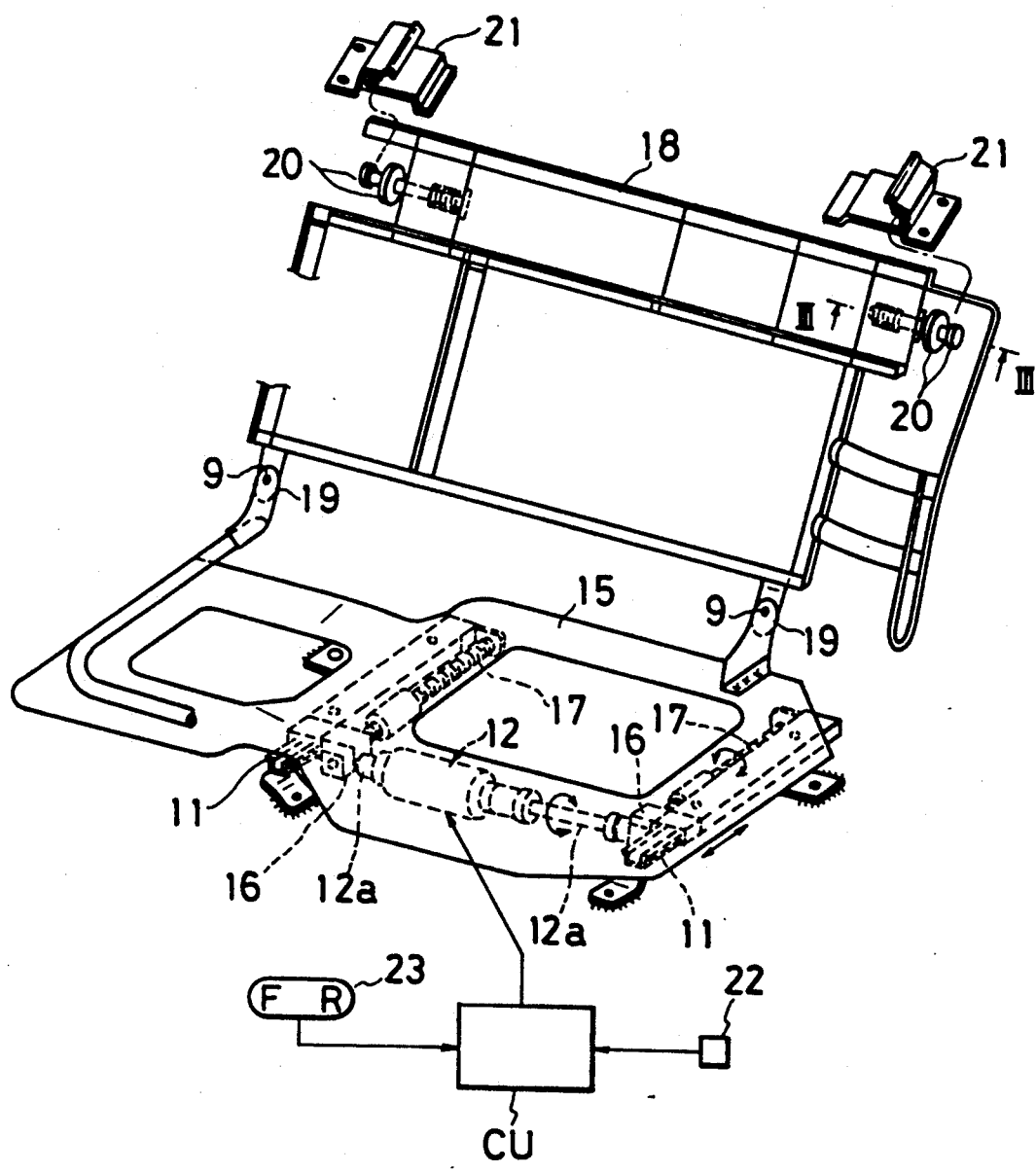

First Embodiment (FIGS. 1 to 3)

Referring to FIG. 1, reference numeral 1 denotes a rear header serving as a member for reinforcing a vehicle body of the automotive vehicle and the rear header 1 extends in a transverse direction of the automotive vehicle at a rear end of a roof 2. A vehicle compartment 3 covered with the roof 2 is provided at its rear portion with a rear seat 4. The rear header 1 is located in the position above the rear seat 4 and secured to the upper end of a back window panel 5. Between the lower end of the back window panel 5 and the rear seat 4 is disposed a rear tray 6.

The rear seat 4 comprises a seat cushion 7, a seat back 8 and a head rest 8a. The seat back 8 is so hinged at its lower end to a rear end of the seat cushion 7 as to be pivotable about a shaft 9. The seat cushion 7 is disposed to be movable forwards and rearwards, i.e. in the longitudinal direction of the automotive vehicle, by an electric motor 12 as a source for driving the seat cushion 7 along and on a rail 11 disposed on a floor 10 and extending in the longitudinal direction thereof.

FIG. 2 shows a structure of a frame of the rear seat 4, in which reference numeral 15 denotes a frame for the seat cushion 7, and the electric motor 12 is mounted on the frame 15. An output shaft 12a of the electric motor 12 is associated with a threaded bar 17 through a gear mechanism 16, and the threaded bar 17 extends in a longitudinal direction of the vehicle body. By rotating the electric motor 12 in a normal direction or in a reverse direction, the threaded bar 17 is pivoted about its axis, thereby moving the frame 15 in a forward direction or in a rearward direction. It is noted herein that the aforesaid structure is per se known, so that the details thereof will be omitted from the description which follows.

Referring to FIG. 2, reference numeral 18 denotes a frame for the seat back 8, and the frame 18 is connected with a hinge 19 to the frame for the seat cushion 7. The frame 18 is provided at its upper portion with a roller 20 which in turn is so accommodated in a slidable bracket 21 secured to the vehicle body as to be movable upwards and downwards.

As shown in FIGS. 1 and 2, reference symbol CU denotes a control unit comprised of, for example, a microcomputer. To the control unit CU is supplied signals from a sensor 22 and a switch 23. The sensor 22 is to sense an angle of inclination of the vehicle body towards its left or right direction. The switch 23 is a manual switch so arranged as to move the seat cushion 7 in the forward direction by rotating the electric motor 12 in one direction (when one end of the switch 23 is kept on pressing. The rotation of the electric motor 12 is suspended as the seat cushion 7 has reached its forward stroke end position (the position indicated by the phantom line F in FIG. 1). On the other hand, as the pressing of the switch 23 has been stopped, the electric motor 12 suspends immediately thereafter and the seat cushion 7 is retained in its current position. As the seat cushion 7 moves forwards, the seat back 8 reclines about the roller 20. As the seat cushion 7 moves forwards in longer distance, the angle θ at which the seat back 8 reclines gets larger.

On the other hand, as the other end of the switch 23 is kept on pressing, the electric motor 12 is allowed to rotate in the reverse direction, thereby moving the seat cushion 7 in the rearward direction of the vehicle body. As the seat cushion 7 reached its rearward stroke end position (the position as indicated by the solid line R in FIG. 1), the electric motor 12 is suspended. As the pressing of the switch 23 has been ceased, the electric motor 12 stops immediately thereafter and the rearward movement of the seat cushion 7 stops, too, thereby retaining the seat cushion 7 in its current position. As the seat cushion 7 moves rearwards, the seat back 8 is allowed to keep on standing erect about the roller 20. As the seat cushion 7 moves rearwards in longer distance, the angle θ at which the seat back 8 gets erect becomes smaller.

When the vehicle body leans at 45° or larger in the left or right direction, then the sensor 22 generates a signal to the control unit CU to that effect and the control unit CU generates a start-up signal to the electric motor 12, thereby forcibly transferring the seat cushion 7 up to its rearward stroke end position R and allowing the seat back 8 to stand erect. This erect movement of the seat back 8 makes the passenger seated on the rear seat 4 ready to assume a posture in which the passenger sits in a stable way. A conventional reclining mechanism which is currently loaded on an automotive vehicle can be employed for this system for protecting the passenger seated on the rear seat 4, so that the system according to the present invention can be constructed at reasonable costs.

Figure 4:
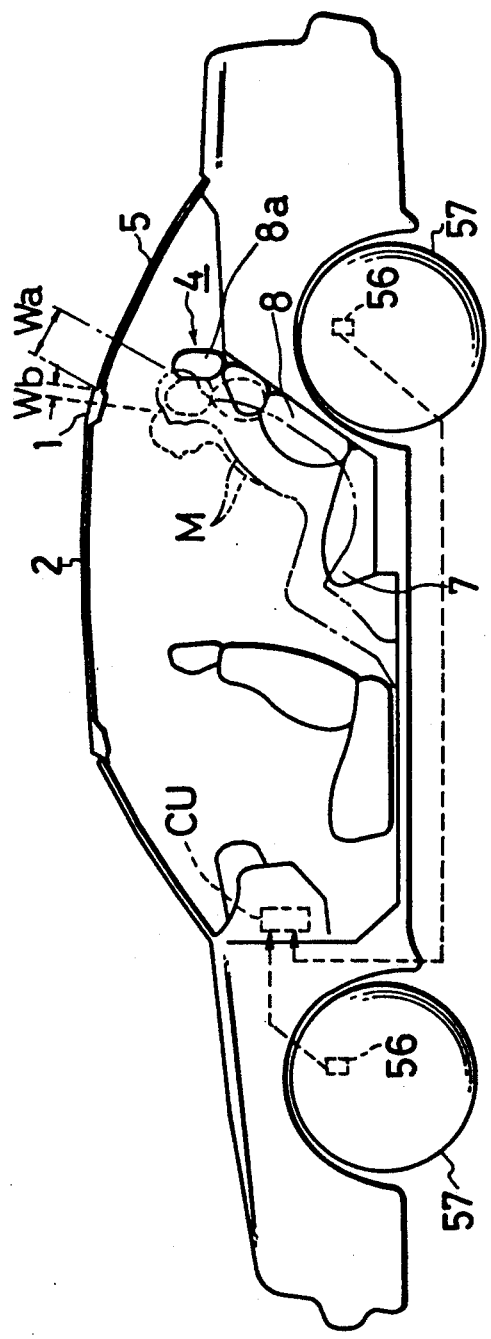

FIG. 4 and the figures which follow thereafter show other embodiments of the system according to the present invention. It is noted herein that the identical elements of those embodiments are provided with the same reference numerals and symbols, so that duplicate description of those elements will be omitted from the following description.

Second Embodiment (FIGS. 4 to 10)

Figure 5:
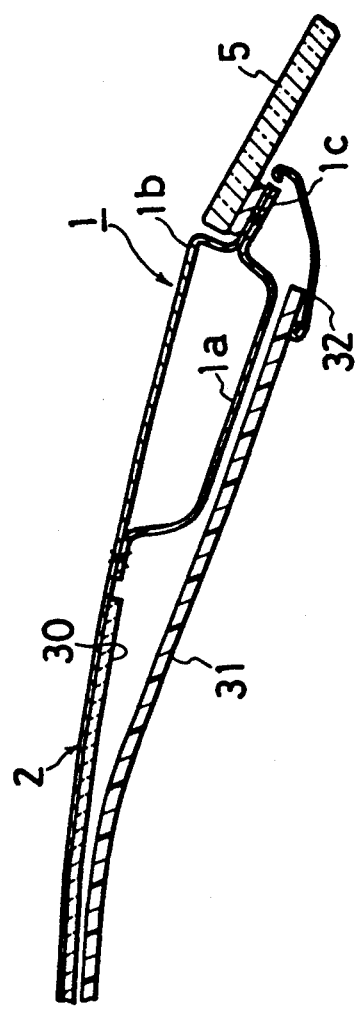

As specifically shown in FIG. 5, the rear header 1 is in a closed sectional shape and comprises an inner member 1a (a rear header inner) made of a pressed steel plate and an outer member 1b (a rear header outer) composed of a rear end portion of the roof 2. An upper end portion of the back window panel 5 is connected with an adhesive to and supported by a flange section 1c on which the inner member 1a is connected to the outer member 1b on their respective rear sides. On the under surface of the roof 2 is stuck a felt material 30 up to the position immediately in front of the rear header 1, and a ceiling member 31 is disposed underneath the roof 2 and the rear header 1. The ceiling member 31 and a terminal portion of the rear header 1 on its rear side is covered with a trim 32.

Although not specifically shown in the drawings, the inner member 1a of the rear header 1 is provided with a number of holes or a plurality of bead sections, thereby lessening impact of the head or other portions of the passenger M seated on the rear seat 4 upon the rear header 1 when the passenger M is caused to move upwards and come into engagement with the rear header 1.

Figure 6:
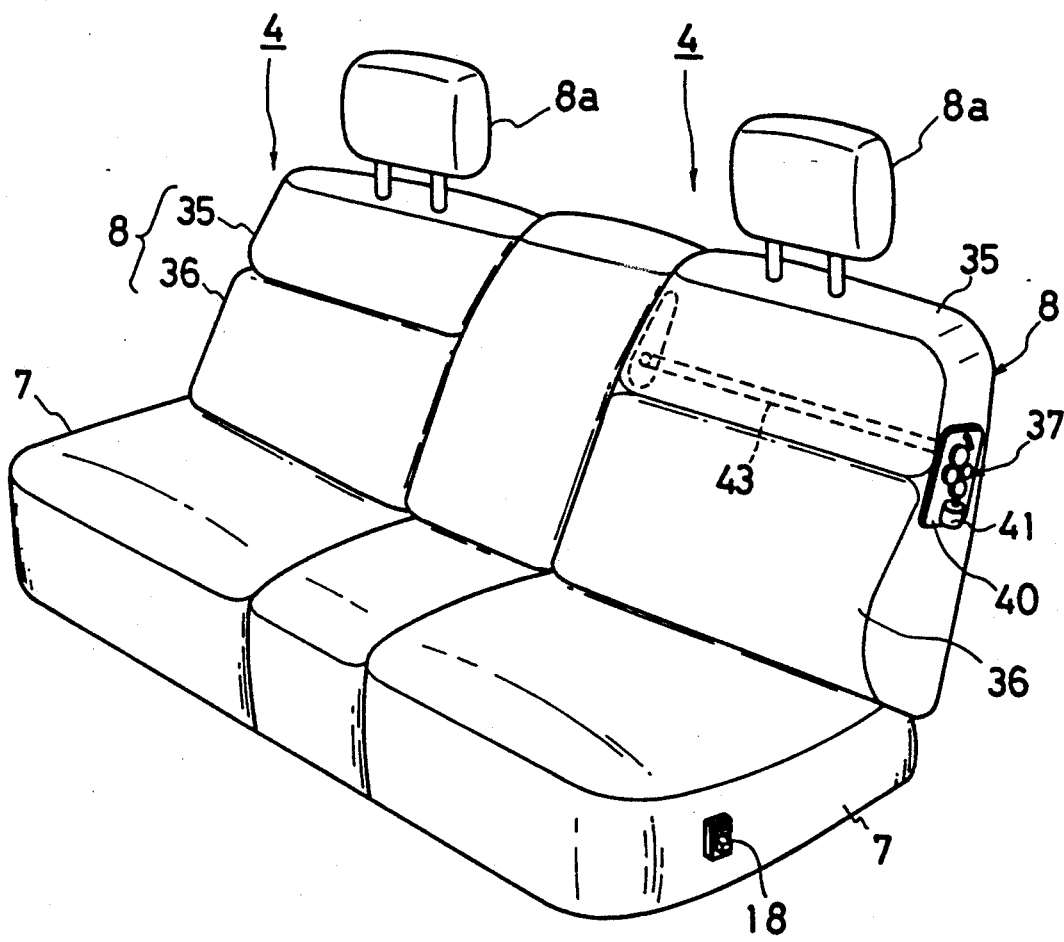

As shown in FIG. 6, each of left-hand and right-hand seat sections of the rear seat 4 comprises the seat cushion 7, the seat back 8 and the head rest 8a. The seat back 8 is divided into two sections, i.e. an upper seat back 35 and a lower seat back 36. On the side face of the seat back 8 is disposed a drive mechanism 37 which in turn drives the upper seat back 35 so as to lean forwards about its lower end portion.

Description will be made of the details of the drive mechanism 37.

As shown in FIGS. 7 and 8, the drive mechanism 37 essentially comprises a base plate 40 disposed along the side surface of the seat back 8, an electric motor 41 fixed to the base plate 40 as a source for driving the seat back 8, and a group of gears for transmitting driving force of the electric motor 41 to a shaft 43 supported by the base plate 40 through a bearing 42. The shaft 43 is so disposed in the inside of the upper seat back 35 so to extend in the transverse direction of the vehicle body and it is integral with the upper seat back 35.

The group of the gears comprises a motor gear 44 fixed to the output shaft 41a of the electric motor 41, an input gear 45 engageable with the motor gear 44, an output gear 46 secured integrally with an outer end portion of the shaft 43, and first and second intermediate gears 47 and 48 so interposed between the input gear 45 and the output gear 46 as to be engageable with the input gear 45 and the output gear 46. To the outside of the output gear 46 is fixed a cam plate 49 which in turn is provided with a first cam groove 49a and a second cam groove 49b on its outer peripheral portion. Above the cam plate 49 is disposed an engageable paw 51 so supported rotatably by a support shaft 50s as to be engageable with the cam grooves 49a and 49b.

To the first intermediate gear 47 and the second intermediate gear 48 is connected a feed plate 52 mounted on the outside of the cam plate 49 so as to be pivotable about a central axis of the shaft 43. The feed plate 52 is biased, for example, by a spring (not shown) in the counterclockwise direction as shown in FIG. 7, so that the first intermediate gear 47 is engaged with both of the input gear 45 and the output gear 46 under ordinary circumstances, as indicated by the solid line in FIG. 7. To the feed plate 52 is mounted an actuator 53 which in turn is so operated as to pivot the feed plate 52 in the clockwise direction as shown in FIG. 7, thereby allowing the second intermediate gear 48 to be engaged with both of the input gear 45 and the output gear 46 as shown by the dot-bar line in FIG. 7, in place of the engagement of the first intermediate gear 47 therewith.

The first intermediate gear 47 comprises an upper gear section 47a engageable with the input gear 45, which has a diameter larger than the second intermediate gear 48, and a lower gear section 47b engageable with the output gear 46, which is identical in diameter to the second intermediate gear 48. Thus, the upper gear section 47a has a number of teeth greater than the teeth of the second intermediate gear 48 while the lower gear section 47b has the same number of teeth as the second intermediate gear 48. Hence, the output gear 46 is driven at a lower speed when the first intermediate gear 47 is engaged with both of the input gear 45 and the output gear 46 as shown by the solid line in FIG. 7 than when the second intermediate gear 48 is engaged with both of the input gear 45 and the output gear 46 as shown by the dot-bar line in FIG. 7.

When the electric motor 41 is driven under the circumstances as described immediately hereinabove, the input gear 45 is rotated by the motor gear 44, thereby rotating the output gear 46 through the first intermediate gear 47 or the second intermediate gear 48. As the output gear 46 rotates, the shaft 43 rotates integrally with the output gear 46, thereby changing an angle of inclination of the upper seat back 35.

In this instance, the direction in which the electric motor 41 rotates is set so as to agree with the direction in which the upper seat back 35 is leaned. In other words, the output gear 46 pivots toward the forward side of the vehicle body in the counterclockwise direction as shown by the solid line in FIG. 7 when the upper seat back 35 is leaned toward the forward side of the vehicle body from an ordinary posture in which the surface of the upper seat back 35 agrees with the surface of the lower seat back 36 in a straight line.

At this time, the cam plate 49 is rotated integrally with the output gear 46, too, and the engageable paw 51 is allowed to be engaged with the second cam groove 49b, thereby driving the upper seat back 35 up to the time when the rotation of the cam plate 49 is suspended, i.e. when the rotation of the output gear 46 and the shaft 43 is suspended. When the upper seat back 35 assumes such an ordinary posture as described hereinabove, the engageable paw 51 is engaged with the first cam groove 42a. On the other hand, when the upper seat back 35 is leaned forwards, it is caused to be engaged with the second cam groove 49b and the upper seat back 35 is leaned forwards at the angle of inclination defined by a central angle formed by the first and second cam grooves 41a and 42b.

The electric motor 41 and the actuator 53 are electrically connected to the control unit CU (as shown in FIG. 4) and driven in accordance with a control signal from the control unit CU.

To the control unit CU are supplied signals from a manual switch 55 and a sensor 56. The manual switch 55 is disposed on a side surface of the seat cushion 7 and operated manually by the passenger M. The sensor 56 is a wheel stroke sensor composed of, for example, a potentiometer, which in turn is mounted to a suspension unit at each of wheels, and it is to sense a rebounding state in which the wheel 57 rebounds.

Figure 9:
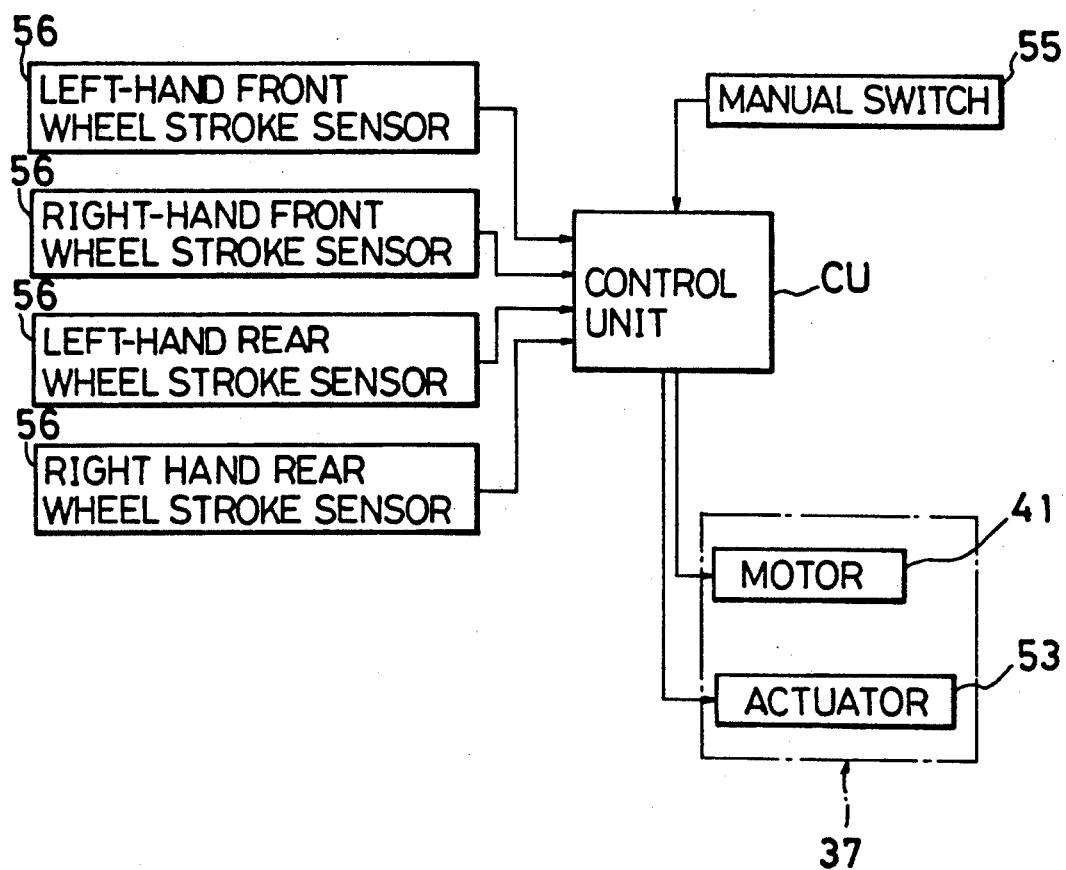

FIG. 9 shows an overall layout of control. Briefly, the control unit CU is operated to control the electric motor 41 and a speed at which the drive mechanism 37 for driving the upper seat back 35 in response to the signals from the wheel stroke sensors 56.

When the passenger M operates the manual switch 55 to operate the drive mechanism 37 for driving the upper seat back 35, the actuator 53 is brought into a state in which it is not operated. This arrangement selects the first intermediate gear 47 as an intermediate gear between the input gear 45 and the output gear 46 and allows the drive mechanism 37 to be driven at a relatively low speed.

Figure 10:
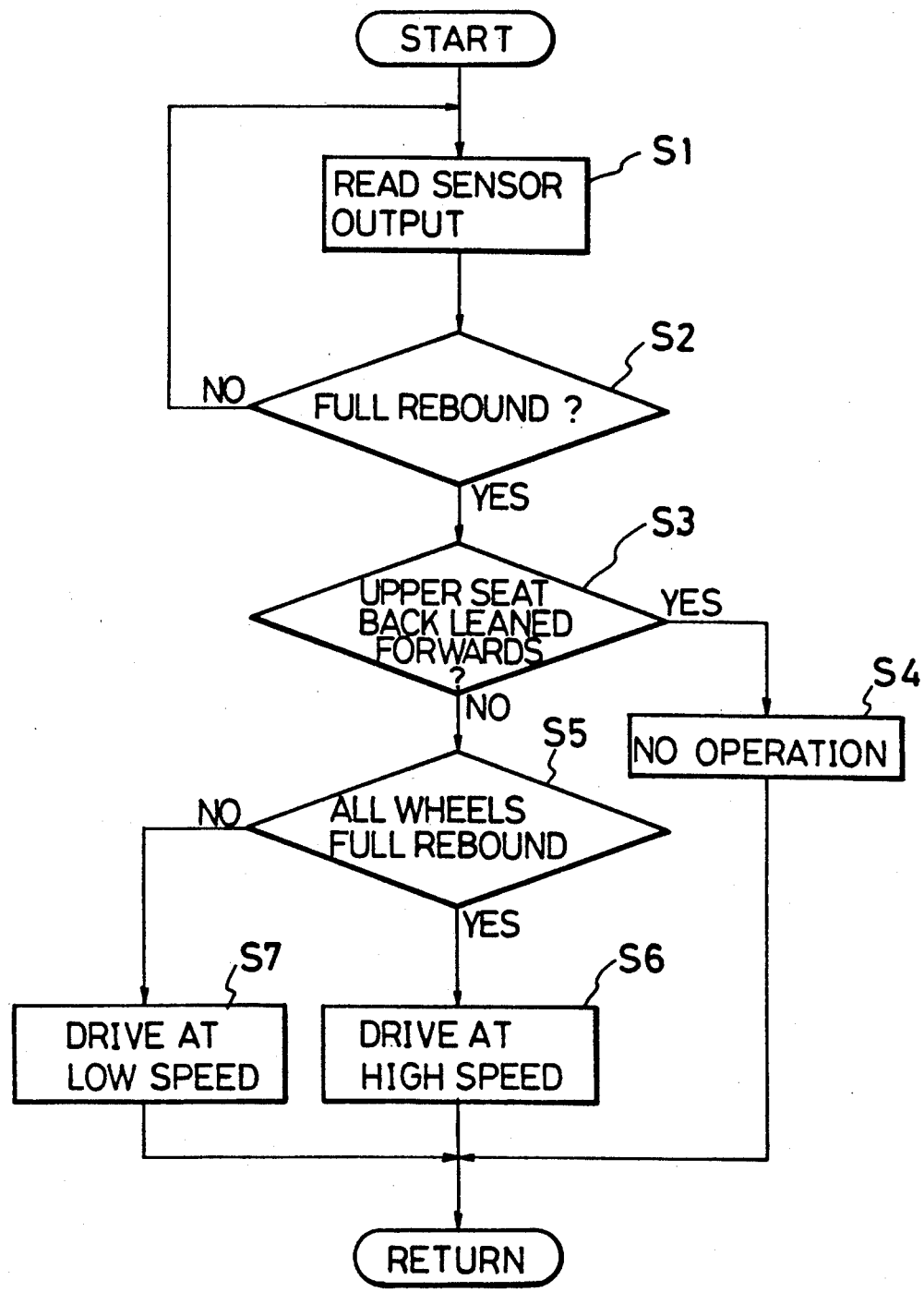

Given the foregoing, the contents of control for the upper seat back 35 will be described with reference to the flow chart as shown in FIG. 10.

After the system has been started, output signals from each of the wheel stroke sensors 56 are read at step S1, followed by proceeding to step S2 at which a decision is made to determine on the basis of the signals from each wheel stroke sensor 56 if the automotive vehicle is currently rebounding.

Determination is made that the automotive vehicle is full rebounding when either one of the following conditions is met:

1. when both of the left-hand and right-hand front wheels are full rebounding;
2. when both of the left-hand and right-hand rear wheels are full rebounding;
3. when the left-hand front wheel and the left-hand rear wheel are full rebounding; and
4. when the right-hand front wheel and the right-hand rear wheel are full rebounding.

It is to be noted herein that determination is made that the corresponding wheels are full rebounding when an output value of the wheel stroke sensors 56 exceeds a predetermined value. More specifically, when the corresponding wheels come into a state in which they are about to rebound to a full extent, it is determined that the corresponding wheels are in such a state that they are full rebounding. And determination is made from either one of the conditions that the automotive vehicle is in a full rebounding state.

At step S2, the result of decision indicates that the automotive vehicle is not full rebounding, the system still keeps on detecting the full rebounding state of the automotive vehicle.

On the other hand, when it is decided at step S2 that the automotive vehicle is full rebounding, then the program flow proceeds to step S3 at which a decision is made to determine if the upper seat back 35 leans forwards on the basis of the state of the switch 55. In other words, it is determined if the upper seat back 35 has already been leaned forwards. When the result of decision at step S3 indicates that the upper seat back 35 is leaned forwards, then the program flow goes to step S4 at which the drive mechanism 37 is brought into such a state that the drive mechanism 37 cannot be operated because it is unnecessary to lean the upper seat back 35 further forwards.

When the result of decision at step S3 indicates that the upper seat back 35 is not leaned forwards, i.e. the front seat surface of the upper seat back 35 is located in the straight line on the same plane as that of the lower seat back 36, on the other hand, then the program flow proceeds to step S5 at which a decision is still made to determine if all the wheels are full rebounding. When it is decided at step S5 that all the wheels are full rebounding, it can be determined that the automotive vehicle is in such an urgent state that it might roll. Then, the program flow goes to step S6 at which the drive mechanism 37 is driven at a high speed. On the other hand, when the result of decision at step S5 indicates that all the wheels are not full rebounding, it is determined that the automotive vehicle is not in such an urgent state, followed by proceeding to step S7 at which the drive mechanism 37 is driven at a low speed.

When the drive mechanism 37 is operated, the upper seat back 35 is allowed to lean forwards at a predetermined angle as shown by the broken line in FIG. 4 and the surface of the rear seat 4 on which the rear passenger's back leans is leaned forwards by a predetermined distance Wb from the rear end portion of the rear header 1. As a consequence, the rear header 1 is caused to be located above the head of the passenger M.

As described hereinabove, when it is detected by the wheel stroke sensors 56 that the automotive vehicle is full rebounding, i.e. the passenger M seated on the rear seat is caused to move upwards, the drive mechanism 37 for the upper seat back 35 is operated to lean the upper seat back 35 forwards, thereby effectively regulating the rear passenger M from moving to the position behind the rear header 1, i.e. toward the back window panel 5.

Hence, the system according to the present invention can remove psychological anxiety caused to occur upon an upward movement of the passenger M seated on the rear seat 4 when the automotive vehicle is full rebounding. Further, it can improve the freedom of design in a arranging for the forward and rearward positions of the rear header 1.

Figure 11:
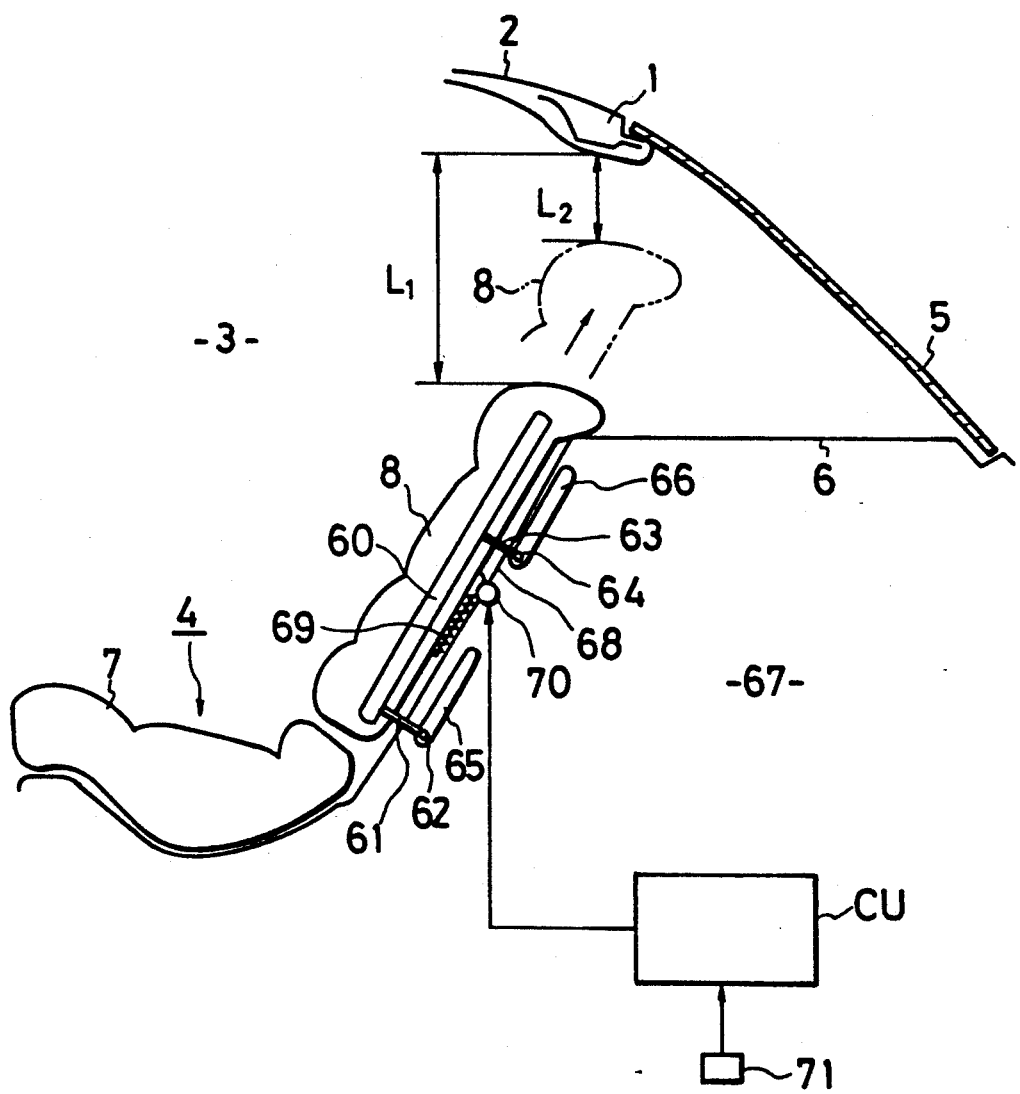
Figure 12:
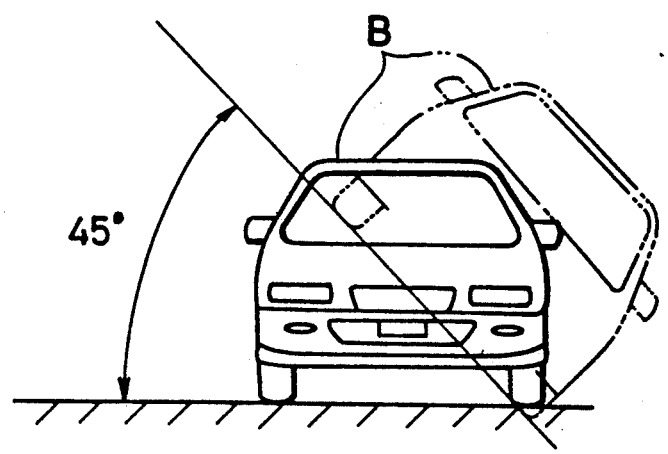

Third Embodiment (FIGS. 11 & 12)

The seat back 8 has a support 60 extending upwards on each of the left-hand and right-hand side portions thereof and the support 60 is provided at its lower end portion with a first slider 62 through a first stay 61 extending backwards and at its upwardly intermediate portion with a second slider 64 through a second stay 63 extending backward. The first slider 62 is accommodated within a first guide rail 65 extending in upward and downward directions, while the second slider 64 is accommodated within a second guide rail 66 disposed above the first guide rail 65. Both of the first and second guide rails 65 and 66 are secured to a partition wall 68 separating the vehicle compartment 3 from a trunk room 67. The first slider 62 is so arranged as to be movable upwardly or downwardly by means of the first guide rail 65, while the second slider 64 is likewise arranged so as to be movable upwardly or downwardly by means of the second guide rail 66.

At a transversely intermediate portion of the seat back 8 is secured a rack 69 extending in upward and downward directions, and a pinion (not shown) engageable with the rack 69 is associated with a motor 70 secured to the partition wall 68, which is driven on the basis of the signal from the control unit CU.

The control unit CU forms and generates a start-up signal to the motor 70 in response to the signal from a G sensor 71 which is to sense an angle of left or right inclination of the vehicle body. In other words, the control unit CU generates the start-up signal to the motor 70 when it has determined on the basis of the signal from the G sensor 71 that the automotive vehicle is leaning at 45° or larger in its left or right direction as shown by the phantom line in FIG. 12. Then, the motor 70 allows the seat back 8 to be moved upwardly along the guide rails 65 and 66, thereby shortening the distance between the upper end of the seat back 8 and the rear header 1 from distance $L_1$ to distance $L_2$. It is further noted in this embodiment that, as the second guide rail 66 is so arranged as to extend toward its upward position to a greater extent, the upper seat back 35 leans gradually more toward its forward position. In other words, the seat back 8 leans forwards to a larger extent as the seat back 8 extends to its higher position. That is, in this embodiment, as the automotive vehicle leans at a larger angle, the seat back 8 is allowed to extend upward while leaning forwards, thereby allowing the head of the passenger seated on the rear seat to be located below the roof 2 and enabling the passenger to be still retained within the vehicle compartment even if the automotive vehicle is leaned to a great extent.

Figure 13:
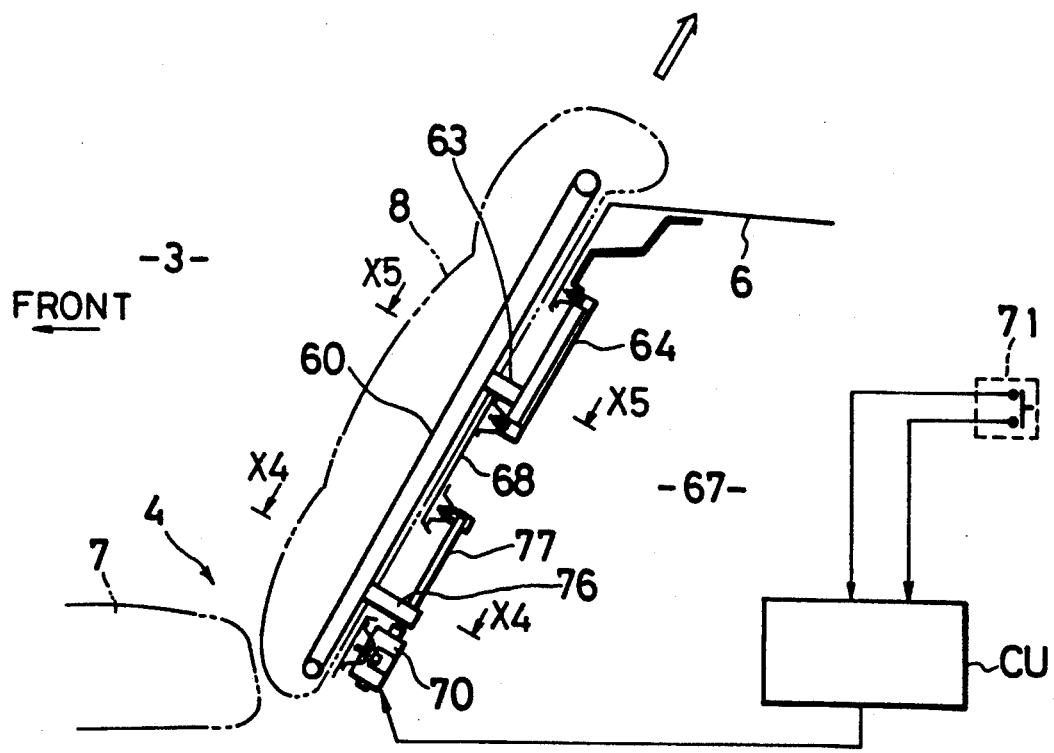
Figure 14:
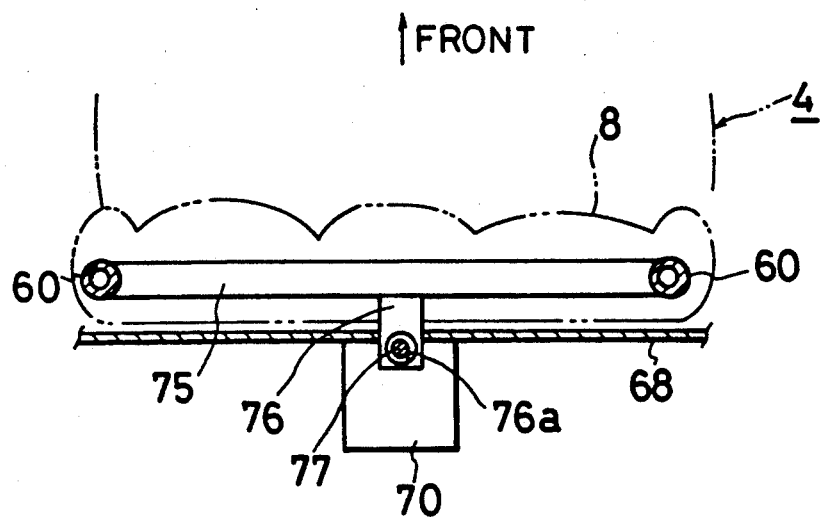
Figure 15:
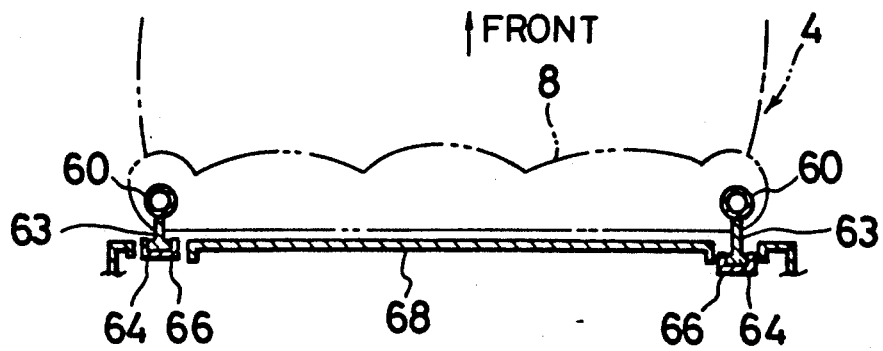

Fourth Embodiment (FIGS. 13 to 15)

This embodiment corresponds to a variation in the third embodiment as described hereinabove. In this embodiment, a transverse bar 75 extending in left and right directions of the automotive vehicle is disposed at a lower end portion of each of the supports 60 so as to bridge both of the supports 60, as shown in FIG. 14. At the intermediate portion of the transverse bar 75 is mounted a projection member 76 which projects in a rearward direction and which is provided at its rear end portion with a through hole 76a as a threaded hole extending in upward and downward directions. On the other hand, a threaded bar 77 extending upwardly and downwardly is rotatably mounted to the partition wall 68. The lower end of the threaded bar 77 is associated with the motor 70, and the threaded bar 77 is so inserted into the through hole 76a as to allow the projection member 76 to project upwards as the threaded bar 77 is threaded through the hole 76a. This arrangement allows the motor 70 to start when the vehicle body B leans at the angle as large as 45° or more in the transverse direction of the vehicle body, thereby projecting the projection member 76 upwards and moving the seat back 8 upwards, too.

Figure 16:
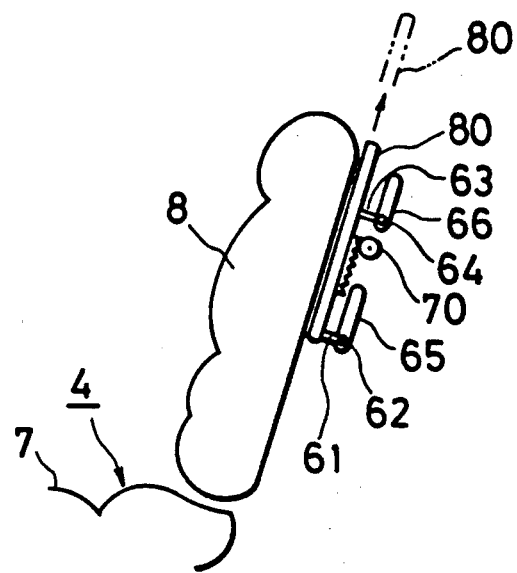
FIG. 16 is directed to the fifth embodiment of the present invention, in which it is a schematic diagram showing the rear seat when looked at its side.

Fifth Embodiment (FIG. 16)

This embodiment corresponds to a second variation of the third embodiment. In this embodiment, a board 80 is mounted on a rear surface of the seat back 8 and it is arranged so as to move upwards along the rear surface thereof by means of the first guide rail 65 and the second guide rail 66. This arrangement can allow the motor 70 to start when the vehicle body B leans at the angle as large as 45° or more in its transverse direction of the vehicle body, thereby moving the board 80 upwards and as a consequence extending the seat back 8 upwards.

Figure 17:
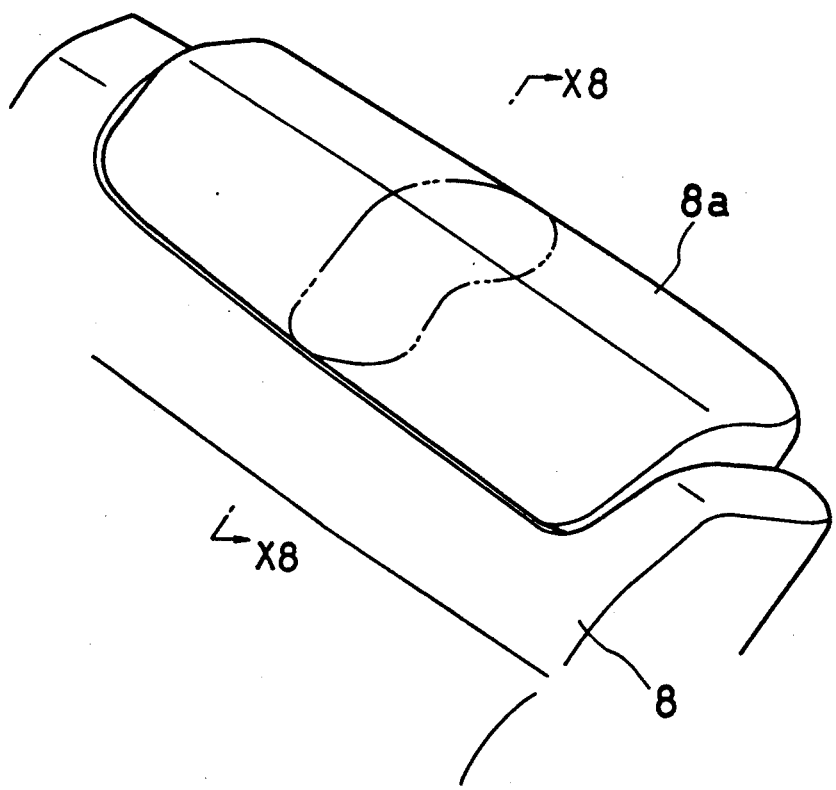
Figure 18:
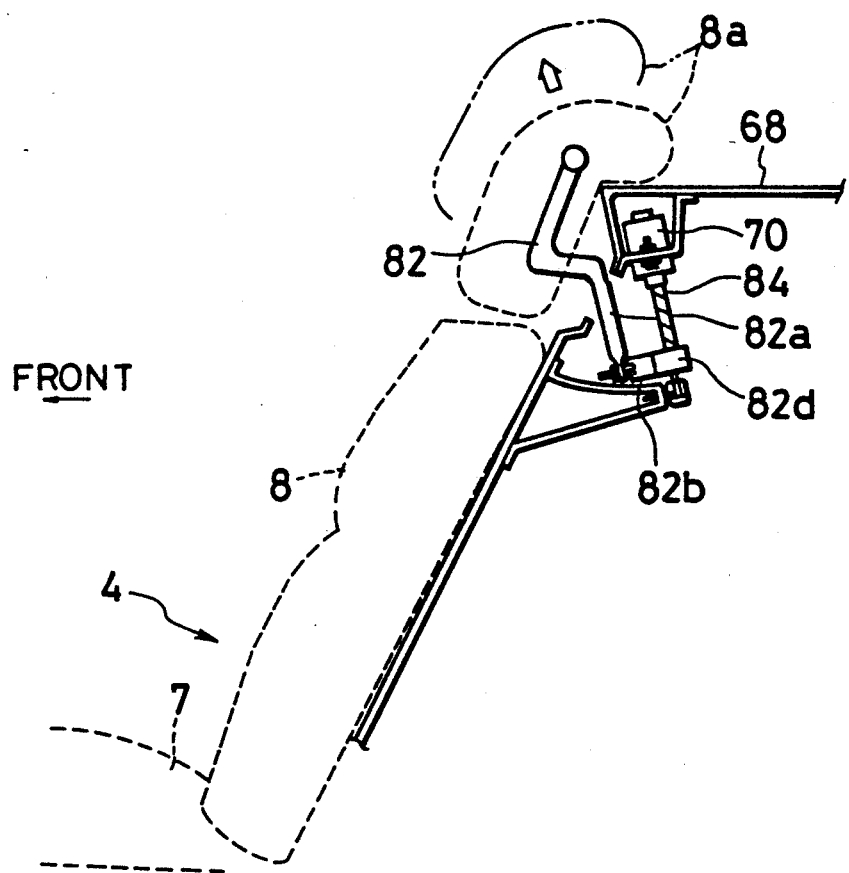
Figure 19:
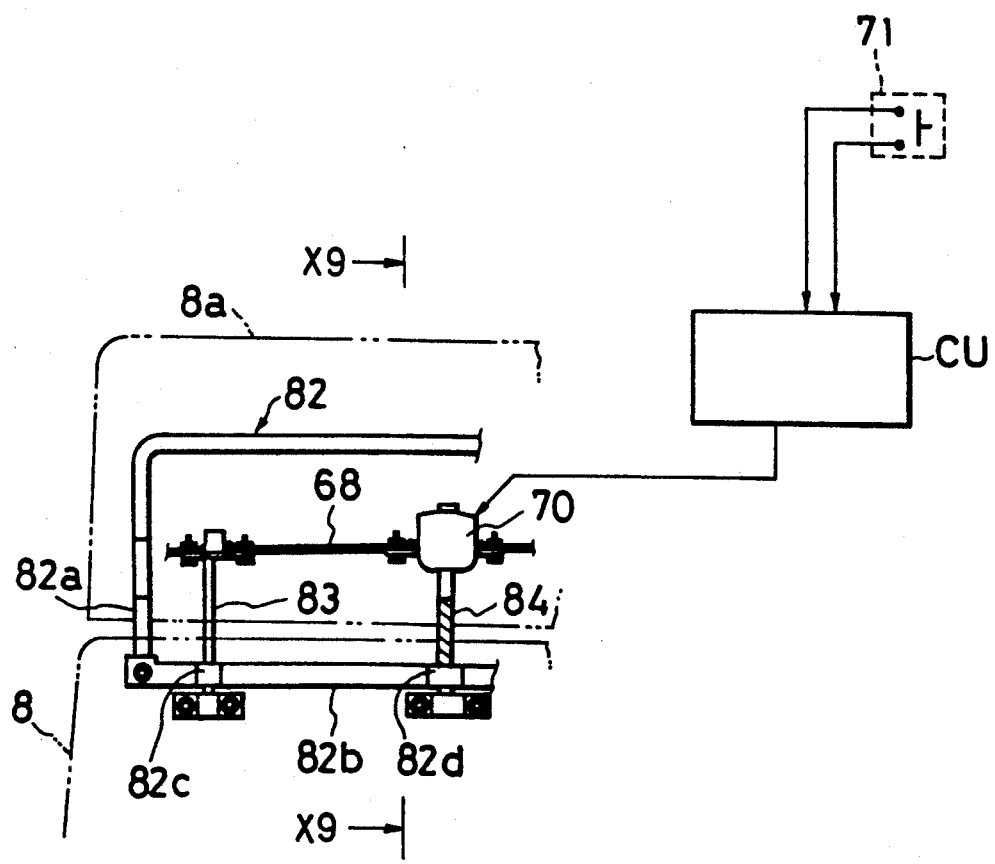

Sixth Embodiment (FIGS. 17 to 19)

This embodiment corresponds to a third variation of the third embodiment. In this embodiment, a frame 82 disposed within the head rest 8a has an extension 82a extending upwards toward the partition wall 68. At a lower end of the extension 82a is disposed a transverse frame 82b extending in the transverse direction, i.e. in the left and right directions, of the vehicle body. The transverse frame 82b is provided at its both end portions with each through hole section 82c having a through hole (not shown) extending in the upward and downward directions of the vehicle body and at its central portion with a threaded hole section 82d having a threaded hole (not shown) extending in the upward and downward directions thereof.

On the other hand, a guide rod 83 is secured to the wall partition 68 so as to correspond to the through hole section 82c of the frame 82, and a threaded bar 84 is rotatably disposed so as to correspond to the threaded hole section 82d. The threaded bar 84 is associated at its upper end with the motor 70 and the start of the motor 70 moves the head rest 8a upwards as indicated by the arrow in FIG. 18 while moving it forwards.

Figure 20:
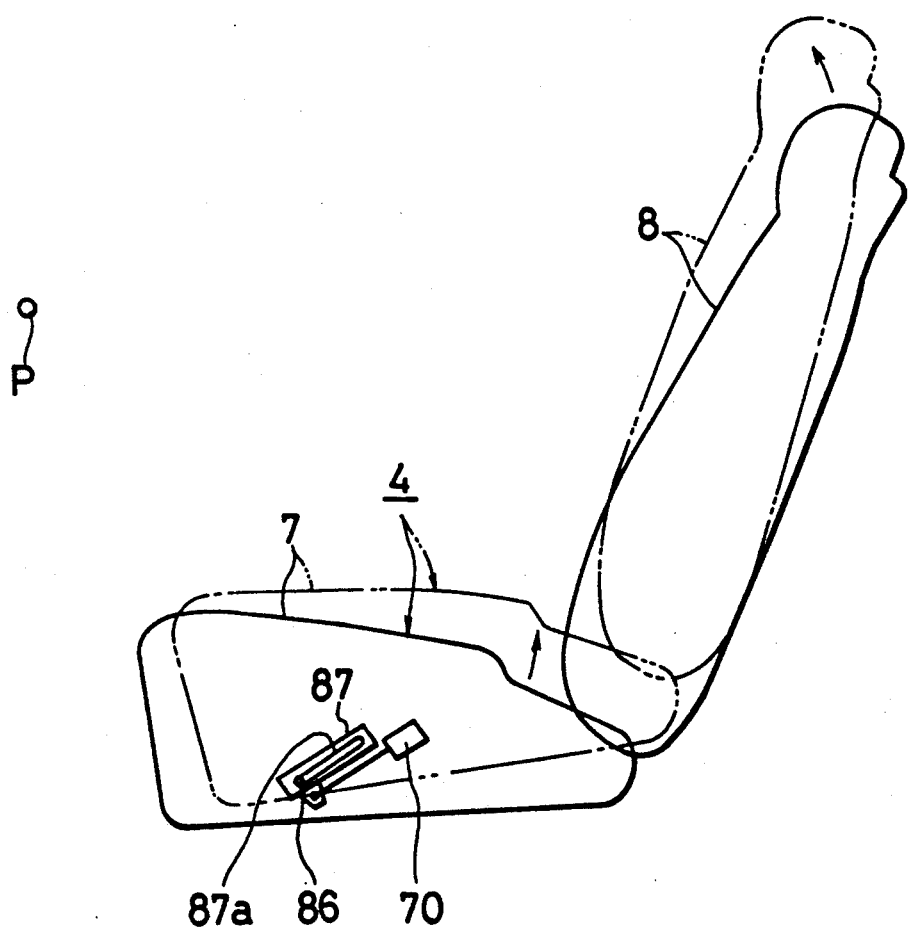
FIG. 20 is directed to the seventh embodiment of the present invention, in which it is a side view showing the side of the rear seat.

Seventh Embodiment (FIG. 20)

In this embodiment, a pin 86 is disposed on each of the both side surfaces of the seat cushion 7 of the rear seat 4 so as to project sideways. The pin 86 is accommodated within a guide rail 87 secured to a member for structuring the vehicle body, and the guide rail 87 is provided with a guide hole 87a which ascends gradually upwards from its forward portion to its rearward portion. The rear seat 4 with this arrangement is allowed to pivot in whole about the central point as indicated by reference symbol P in the drawing when the motor 70 secured to the member for structuring the vehicle body is driven, thereby raising the rear portion of the seat cushion 7 in an upward direction and as a result displacing the seat back 8 upwards while leaning the upper end portion of the seat back 8 in the forward direction of the vehicle body.

Figure 21:
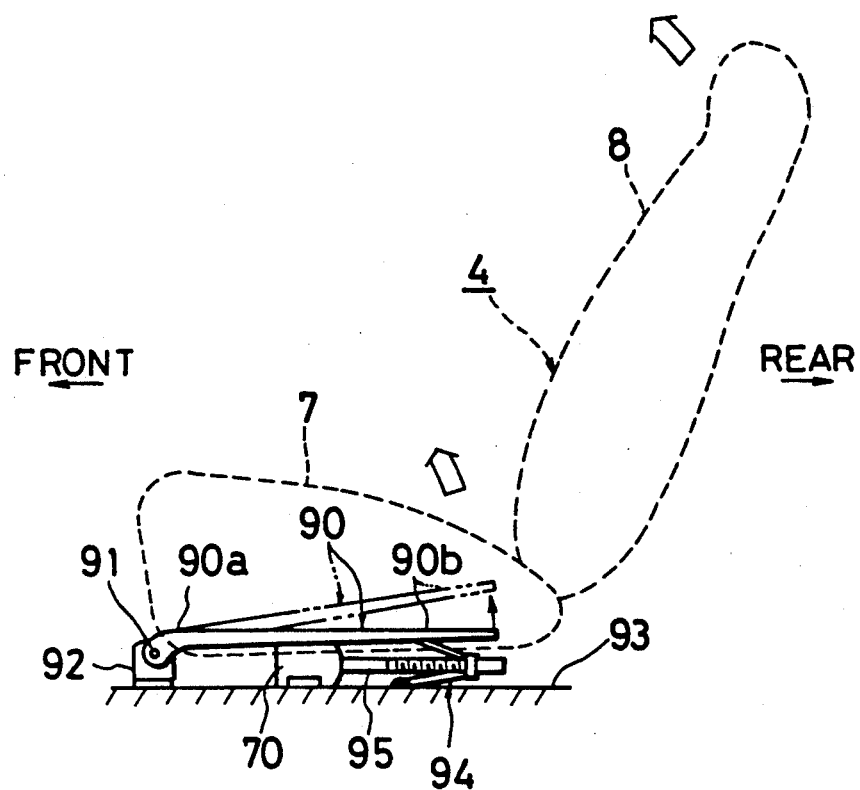
Figure 22:
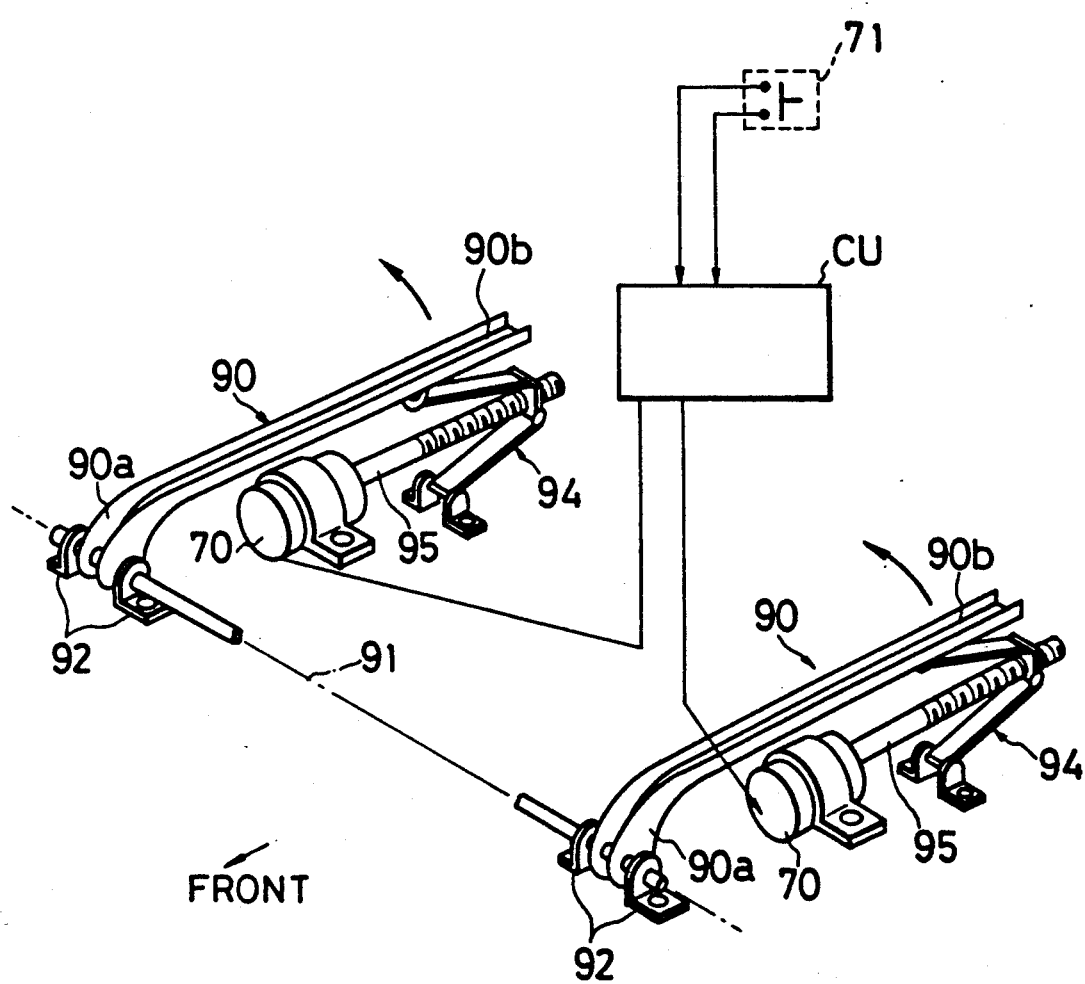

Eighth Embodiment (FIGS. 21 & 22)

In this embodiment, as shown in FIGS. 21 and 22, the seat cushion 7 of the rear seat 4 is provided with a pair of left-hand and right-hand frames 90 each extending in the forward and rearward directions of the vehicle body. The frame 90 is so arranged as to be lifted or laid down in a horizontal position about a common shaft 91 mounted to a front end portion 90a thereof. The common shaft 91 is mounted to a floor panel 93 through a bracket 92, and the frame 90 is rotatably mounted to the common shaft 91. A link-type jack 94 is interposed between a rear end portion 90b of the frame 90 and the floor panel 93, and a threaded bar 95 is associated with the motor 70 so as to raise the jack 94, while the motor 70 is secured to the floor panel 93. With this arrangement, as the motor 70 starts, the jack 94 is raised to pivot the rear seat 4 on the common shaft 91, thereby raising the rear portion of the seat cushion 7 upwards and displacing the seat back 8 upwards while leaning its upper portion forwards, as shown in FIG. 21.

Figure 23:
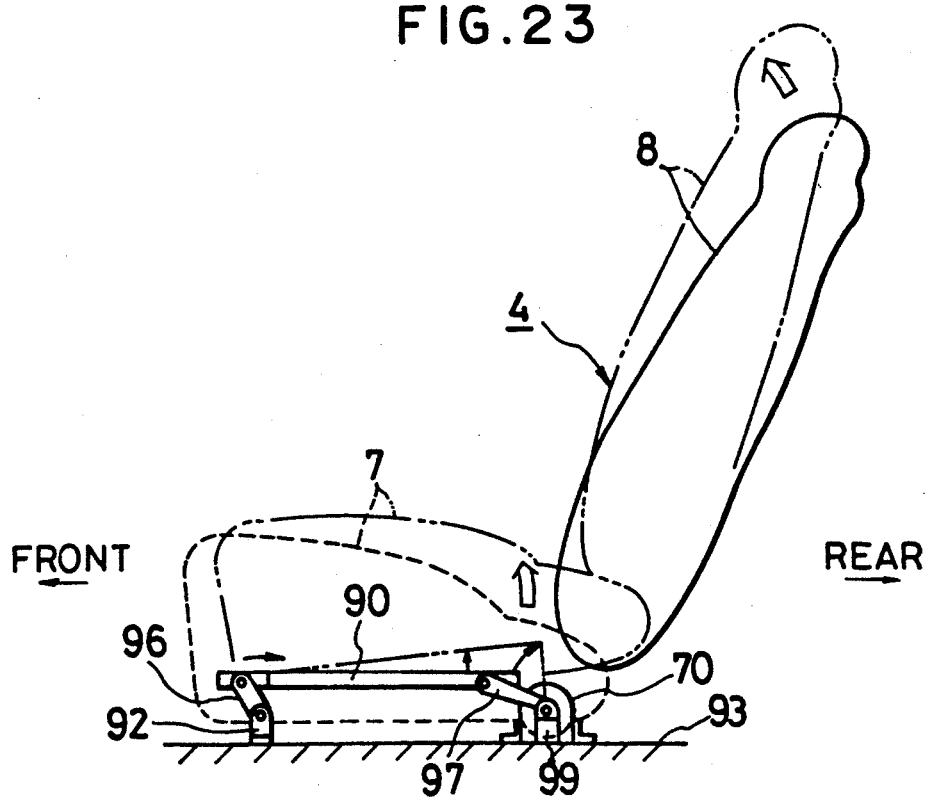
Figure 24:
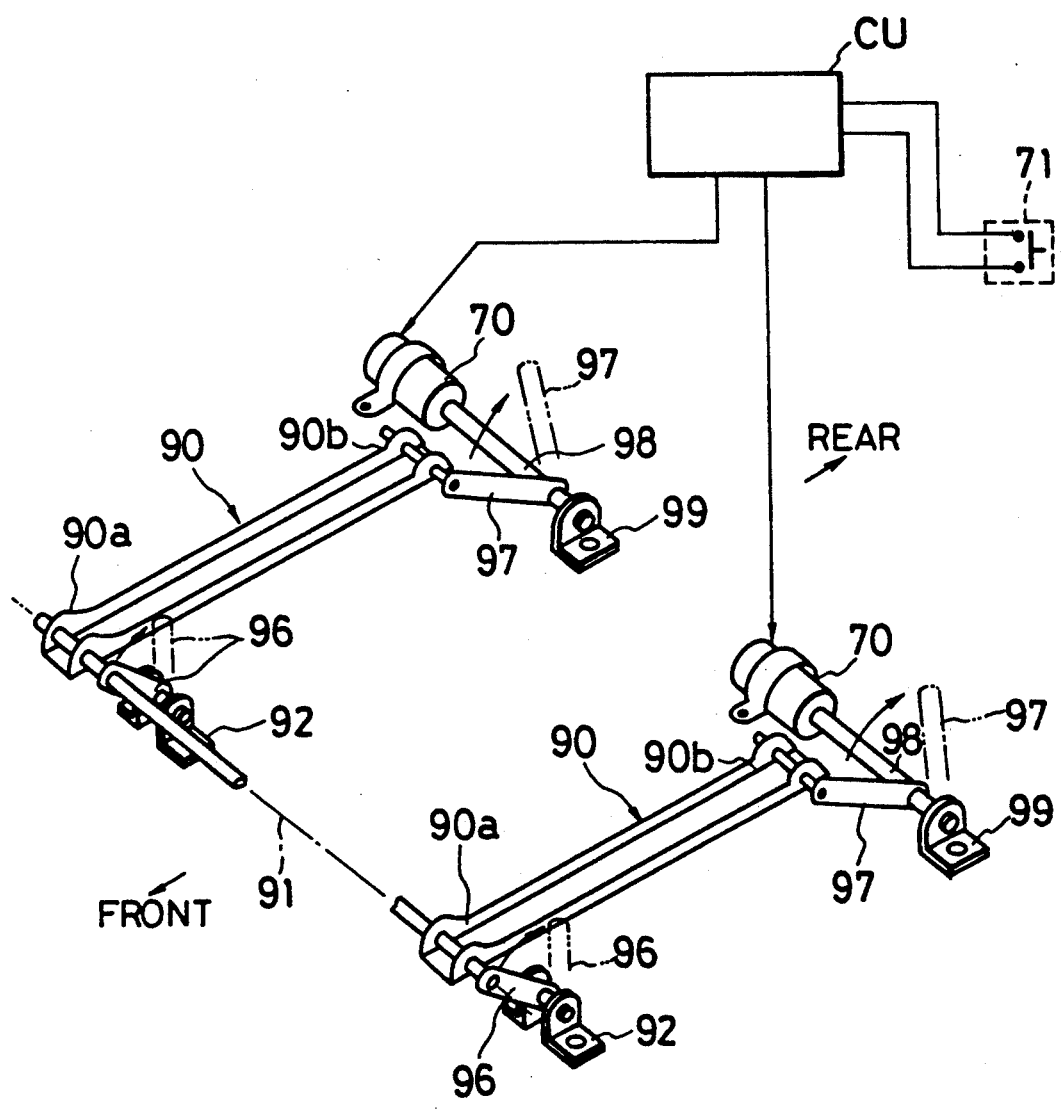
Figure 25:
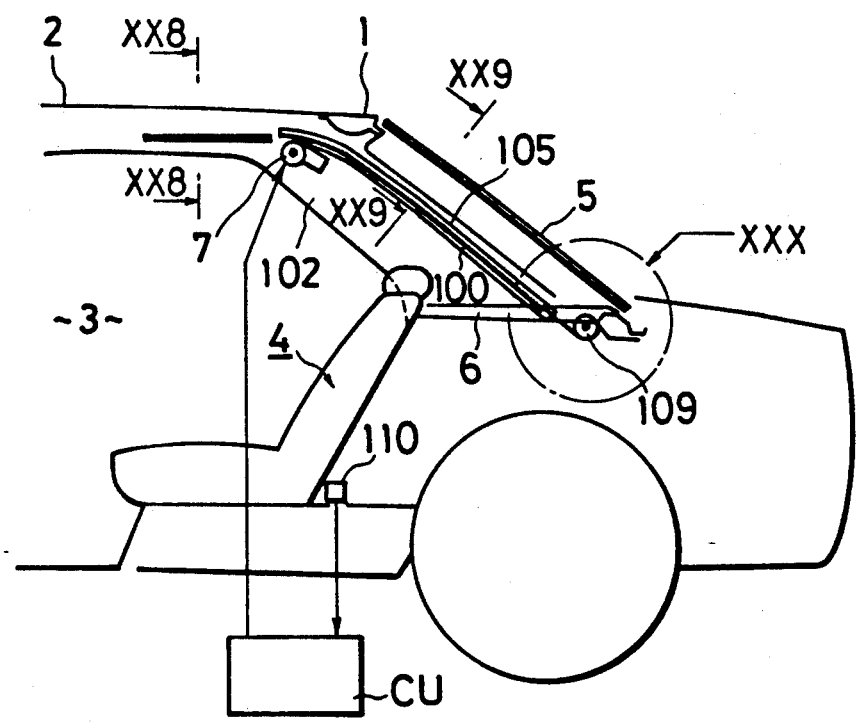

Ninth Embodiment (FIGS. 23 & 24)

This embodiment corresponds to a variation of the eighth embodiment. In this embodiment, the front end portion 90a of the frame 90 is mounted to the floor panel 93 through a first link (a front link) 96, while the rear end portion 90b thereof is mounted to the floor panel 93 through a second link (a rear link) 97 which in turn is rotatably connected at its one end to the frame 90 and secured at its other end to a shaft 98. The shaft 98 is then rotatably mounted to a bracket 99 mounted to the floor panel 93 and it is associated with the motor 70 so as to raise the rear link 97 upwards as indicated by the arrow in FIG. 24 when the motor 70 has been started. The rear link 97 is longer in length than the front link 96, and this arrangement enables the rear portion of the seat cushion 7 to be raised to the position higher than the front portion thereof, thereby displacing the seat back 8 upwards while leaning its upper portion forwards.

Tenth Embodiment (FIGS. 25 to 30)

Figure 26:
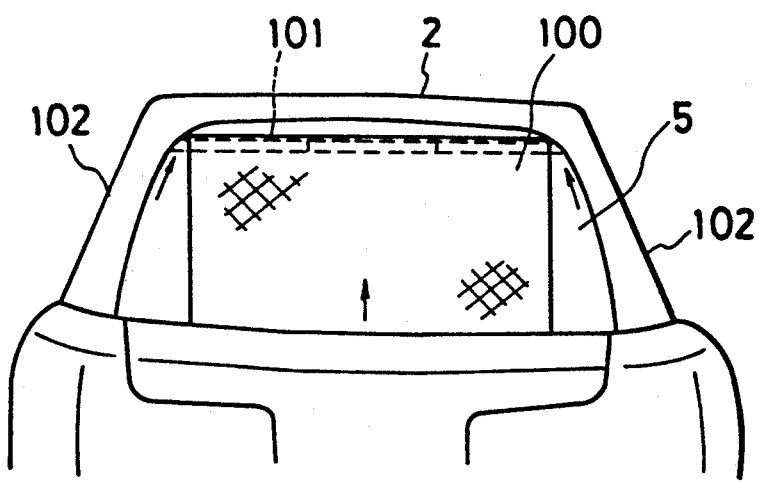
Figure 27:
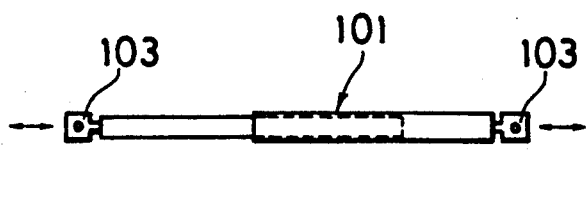
Figure 29:
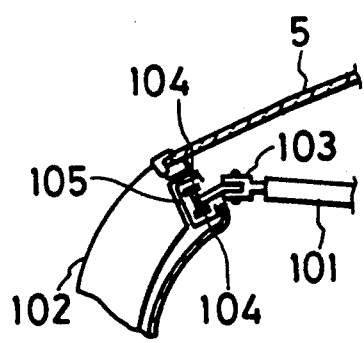
Figure 30:
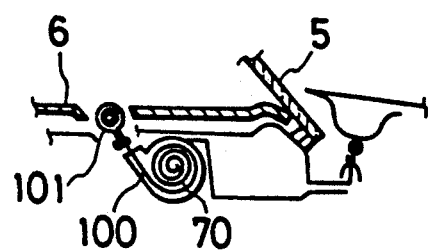

In this embodiment, a net 100 is mounted in front of the back window panel 5 within the vehicle compartment as shown in FIG. 26. The net 100 has substantially the same size as the back window panel 5 and the upper end of the net 100 is secured to a bar 101 which extends over the entire length between a left-hand rear pillar 102 and a right-hand rear pillar 103. As shown in FIG. 29, a roller 104 with a universal coupling 103 mounted thereto is mounted to each of the both ends of the bar 101, and the roller 104 is accommodated in a rail 105 which in turn extends over the entire length in its upward and downward directions at a rear end of the rear pillar 102. As shown in FIG. 27, the bar 101 is composed of a double cylinder form in which it is contractibly extensible in its lengthwise direction, thereby allowing a smooth upward movement of the bar 101.

Figure 28:
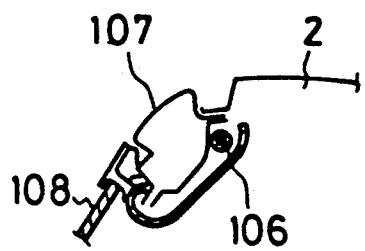

The roller 104 is connected to the lower end of a wire 106 which extends upwards so as to be associated with the motor 70 disposed at an upper end of the rear pillar 102. Referring to FIG. 28, reference numeral 107 denotes a roof side rail and reference numeral 108 denotes a door glass panel.

A lower end of the net 100 is wound by a retractor 109 and it is fully wound up on the retractor 109 in ordinary instances.

The control unit CU generates a start-up signal to the motor 70 in response to a signal from a sensor 110 for sensing an angle of left or right inclination of the vehicle body. The control unit CU is so arranged as to generate such a start-up signal in response to the signal from the sensor 110 when it is determined in response to the signal from the sensor 110 that the vehicle body is leaned in its left-hand or right-hand direction at 20° or more. This arrangement allows the net 100 to move upwards through guidance by the guide rail 105 and to be located in the position in which it covers the back window panel 5, thereby protecting the passenger seated on the rear seat from hitting its head directly against the back window panel 5 and securing protection of the rear passenger within the vehicle compartment.

Figure 31:
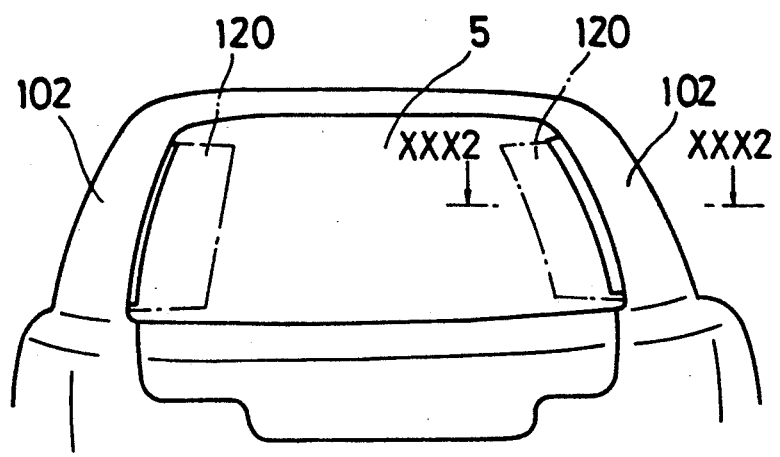
Figure 32:
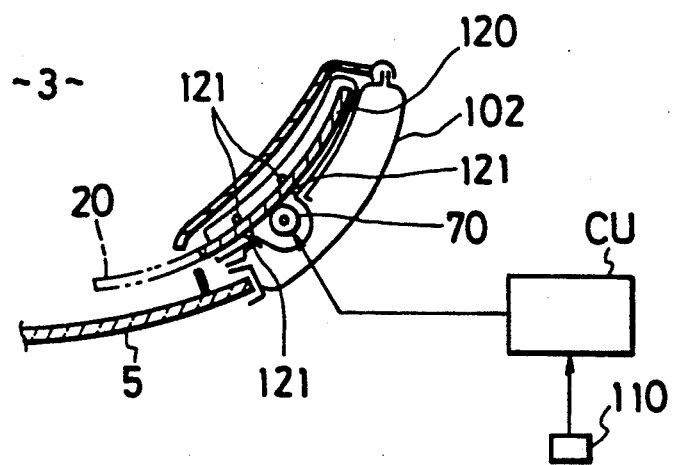

Eleventh Embodiment (FIGS. 31 & 32)

As shown in FIGS. 31 and 32, a board 120 is mounted to the rear pillar 102 so as to be contractibly extensible over the entire height of the rear pillar 102. The board 120 is extended through guidance by the guide roller 121 from the rear end of the rear pillar 102 toward its central portion in the transverse direction of the vehicle body along the back window panel 5. Likewise in the tenth embodiment, the motor 70 is started when it is determined that the vehicle body is leaned at the angle as high as 20° or more, thereby extending or projecting the board 120 within the vehicle compartment 3 in its transverse direction to block the rear passenger from approaching to the both side portions of the back window panel 5 and permitting the passenger seated on the rear seat to be held within the vehicle compartment.

Figure 33:
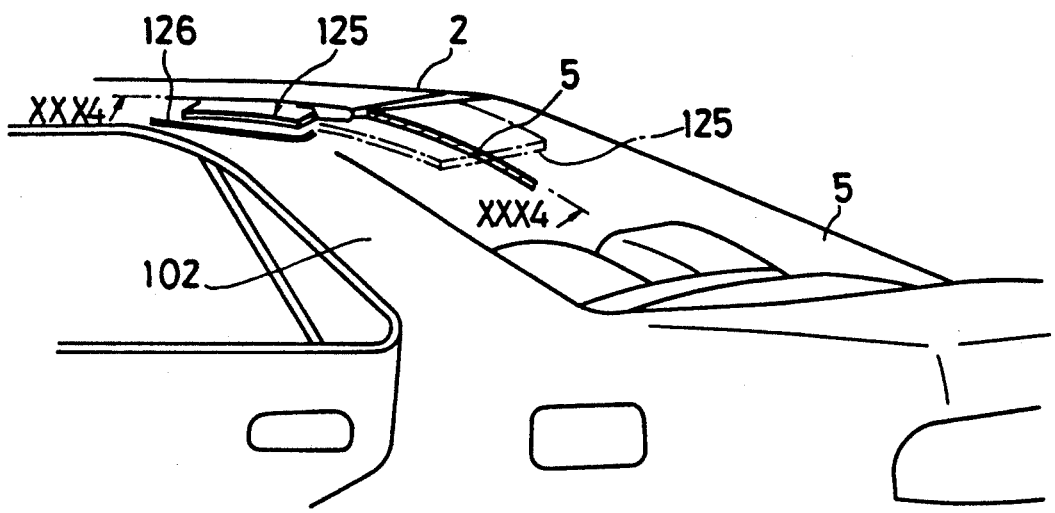
Figure 34:
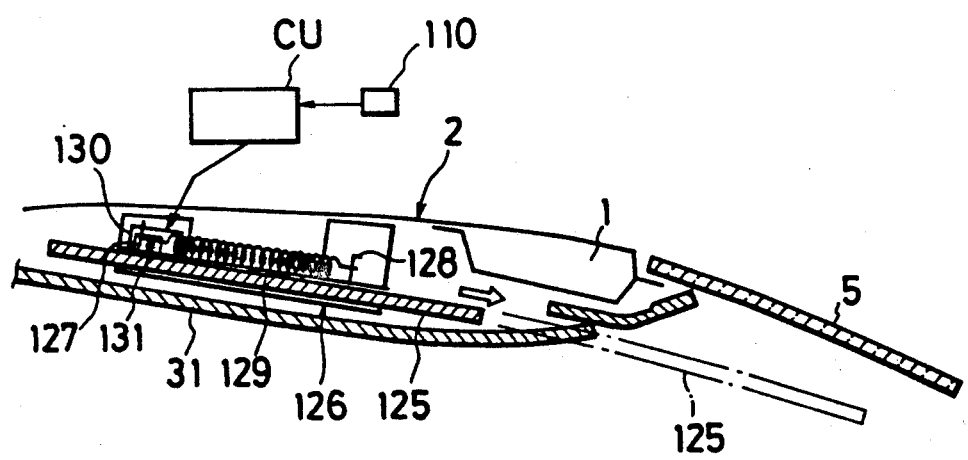
Figure 35:
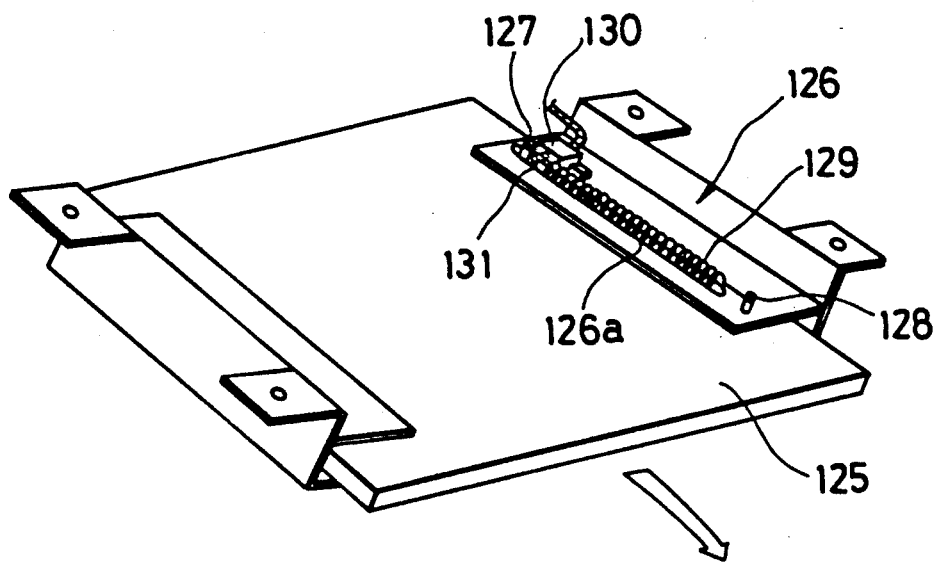

Twelfth Embodiment (FIGS. 33 to 35)

In this embodiment, a board 125 is disposed at a rear portion of the roof 2 and, likewise in the eleventh embodiment, it is arranged to block the approach of the head of the rear passenger toward an upper portion of the back window panel 5 when it is determined that the vehicle body is leaned at the angle as high as 20° or more. More specifically, the board 125 is interposed through a bracket 126 between the roof 2 and the ceiling member 31. The bracket 126 is provided a long hole 126a extending in its forward and rearward directions, as shown in FIG. 35, a pin 127 is inserted over the entire length of the long hole 126a in its vertical direction and a lower end of the pin 127 is fixed to a front end portion (on the forward side of the vehicle body) of the board 125. Between an upper end portion of the pin 127 and a second pin 128 projecting upwards at a rear end portion of the bracket 126 is so mounted a tension spring 129 as to always bias the board 125 to the backward direction of the vehicle body. At a front end portion of the bracket 126 is disposed a solenoid 130 to which a third pin 31 is mounted so as to be contracted when the solenoid 130 is energized and so as to be extended when it is deenergized. The third pin 131 is engaged with the second pin 127 when the former is extended. In case of emergency, etc., the solenoid 130 is energized by the signal from the control unit CU, thereby releasing the engagement of the third pin 131 with the second pin 127 and projecting the board 125 rearward.

Figure 36:
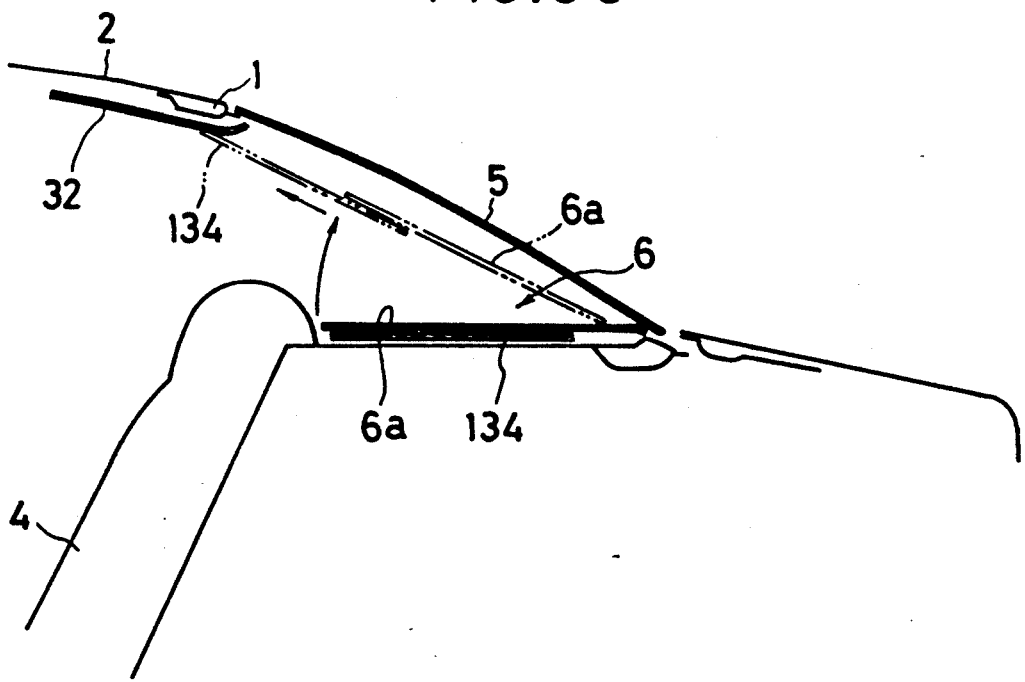
Figure 37:
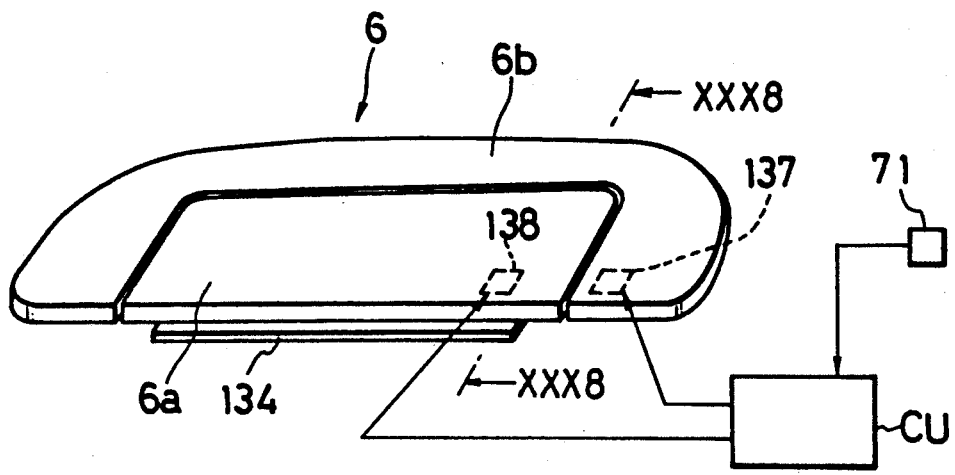
FIG. 37 is a perspective view showing a rear tray.
Figure 38:
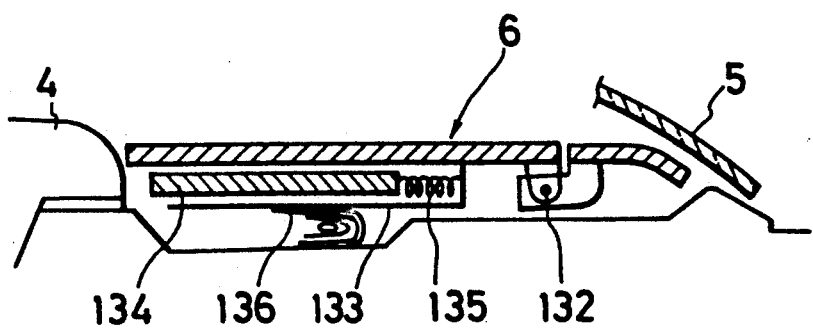

Thirteenth Embodiment (FIGS. 36 to 38)

In this embodiment, a portion of the rear tray 6 is so raised toward an upright position and extended about its rear end portion as to block the back window panel 5 when it is determined that the vehicle body leans at the angle as high as 20° or more. In other words, as shown in FIG. 37, a central portion of the rear tray 6 is composed of a raised board portion 6a a rear end of which is mounted to a main body of the rear tray 6b with a hinge 132 (FIG. 38). On a rear surface of the raised board portion 6a is mounted a sub-board 134 through a bracket 133 as shown in FIG. 38, and the sub-board 134 is always biased in a forward direction by a spring 135. Further, both of the raised board portion 6a and the sub-board 134 are biased by a plate spring 136 in such a direction that they stand erect. They are held at their original positions, as shown in FIG. 38, by two solenoids, i.e. a first solenoid 137 and a second solenoid 138 (FIG. 37). More specifically, the first solenoid 137 is mounted at the front end portion of the main body 6b of the rear tray while the second solenoid 138 is mounted to the sub-board 134. Likewise in the twelfth embodiment, the first and second solenoids 137 and 138 are provided with pins (not shown) which in turn is so arranged as to be shortened when they are excited and to be extended when they are deenergized. The pin of the first solenoid 137 is engaged with the raised board section 6a when it is extended, and the pin of the second solenoid 138 is likewise engaged with the raised board section 6a when it is extended, thereby holding the state as shown in FIG. 38.

When it is determined that the vehicle body is leaned at the angle as high as 20° or more, the first solenoid 137 is first excited to thereby raise the raised board section 6a by the plate spring 136, together with the sub-board 134. Thereafter, the second solenoid 138 is excited, thereby extending the sub-board 134 forwards from the raised board section 6a.

It is to be understood that the foregoing text and drawings relate to embodiments of the present invention given by way of examples but not limitation. Various other embodiments and variants are possible within the spirit and scope of the present invention.

What is claimed is:

1. An apparatus for protecting a passenger seated on a rear seat of an automotive vehicle, said apparatus comprising:

moving means for moving an upper end portion of a seat back section of the rear seat in a forward direction with respect to the automotive vehicle;

detecting means for detecting movement of the automotive vehicle having a vertical component; and control means for controlling said moving means in accordance with said detecting means such that the upper end portion of the seat back is moved forward when movement of the automotive vehicle having a vertical component is detected by the detecting means;

wherein said moving means comprises seat back inclination adjusting means for adjusting an angle of inclination of the seat back, said inclination adjusting means comprising of a first electric motor; and wherein said control means controls the inclination adjusting means such that the angle of inclination of the seat back is made smaller when movement of the automotive vehicle having a vertical component is detected by the detecting means.

2. An apparatus as claimed in claim 1, wherein the seat back of the rear seat is divided into an upper seat back and a lower seat back, wherein said moving means comprises leaning means for leaning an upper end portion of the upper seat back forward about a lower end portion thereof, said leaning means comprising an electric motor; and wherein said control means controls said leaning means such that the upper end portion of the upper seat back is moved forward when movement of the automotive vehicle having a vertical component is detected by the detecting means.

3. An apparatus as claimed in claim 1, wherein the rear seat comprises a seat cushion section formed integrally with the seat back; wherein said moving means comprises means for moving the seat cushion upward to a larger extent at a rear end thereof than at a front end thereof; and wherein the control means controls said moving means such that the upper end portion of the seat back is moved forward by moving the rear end of the seat cushion upward to a larger extent than the front end of the rear seat when said type of movement of the automotive vehicle is detected by the detecting means.

4. An apparatus as claimed in claim 3, wherein said moving means comprises a jack disposed between the seat cushion of the rear seat and a floor panel of the automotive vehicle.

5. An apparatus as claimed in claim 3, wherein said moving means comprises a linking mechanism disposed between the seat cushion of the rear seat and a floor panel of the automotive vehicle, said linking mechanism allowing upward movement of the seat cushion and comprising an electric motor.

6. An apparatus as claimed in claim 1, wherein the rear seat comprises a head rest disposed at the upper end portion of the seat back; said moving means comprises head rest moving means for moving the head rest forward with respect to the seat back; and wherein said control means controls said head rest moving means such that the upper end portion of the seat back is moved forward by moving the head rest forward when movement of the automotive vehicle having a vertical component detected by the detecting means.

7. An apparatus for protecting a passenger seated on a rear seat of an automotive vehicle, said apparatus comprising:
   moving means for moving at least an upper end portion of a seat back section of the rear seat upward while preventing upward movement of a seat cushion section of the rear seat;
   detecting means for detecting movement of the automotive vehicle having a vertical component; and
   control means for controlling said moving means such that the upper end portion of the seat back is moved upward when movement of the automotive vehicle having a vertical component is detected by the detecting means.

8. An apparatus as claimed in claim 7, wherein said moving means comprises means for moving the entire seat back upward.

9. An apparatus as claimed in claim 7, wherein said moving means comprises means for moving a head rest disposed at the upper end of the seat back upward.

10. An apparatus as claimed in claim 1 or 7, wherein said detecting means comprises:
    wheel movement detection means for detecting when a wheel of the automotive vehicle is in a full rebound state; and
    detecting means responsive to said wheel movement detection means for determining a possibility of the passenger seated on the rear seat moving upward from the rear seat.

11. An apparatus as claimed in claimed in claim 1 or 7, wherein said detecting means comprises:
    angle detecting means for detecting an angle of inclination of the automotive vehicle in its left or right direction; and
    determining means for determining a possibility of the passenger seated in the rear seat moving upward from the rear seat when said detecting means detects an angle of inclination of the automotive vehicle of at least 45°.

12. An apparatus as claimed in claimed in claim 1 or 7, wherein said detecting means comprises:
    angle detecting means for detecting an angle of inclination of the automotive vehicle in its left or right direction; and
    determining means for determining a possibility of the passenger seated in the rear seat moving upward from the rear seat when said detecting means detects an angle of inclination of the automotive vehicle of at least 20°.

* * * * *